(12) United States Patent
Ganesan et al.

(10) Patent No.: US 7,392,223 B1
(45) Date of Patent: Jun. 24, 2008

(54) ELECTRONIC BILLING WITH UPDATEABLE ELECTRONIC BILL SUMMARY

(75) Inventors: Ravi Ganesan, Norcross, GA (US); Kenneth Hobday, Powell, OH (US)

(73) Assignee: Checkfree Corporation, Norcross, GA (US)

( * ) Notice: Subject to any disclaimer, the term of this patent is extended or adjusted under 35 U.S.C. 154(b) by 0 days.

(21) Appl. No.: 09/387,764

(22) Filed: Sep. 1, 1999

Related U.S. Application Data

(63) Continuation-in-part of application No. 09/017,169, filed on Feb. 2, 1998, now Pat. No. 6,055,567.

(51) Int. Cl.
*G06Q 30/00* (2006.01)

(52) U.S. Cl. .............................. 705/40; 705/34; 705/35; 705/36; 705/39; 705/26; 705/27

(58) Field of Classification Search .................. 705/26, 705/27, 34, 39, 40, 400, 401, 35, 36
See application file for complete search history.

(56) References Cited

U.S. PATENT DOCUMENTS

| | | | |
|---|---|---|---|
| 4,277,837 A | 7/1981 | Stuckert | 364/900 |
| 4,319,336 A | 3/1982 | Anderson et al. | 364/900 |
| 4,460,960 A | 7/1984 | Anderson et al. | 364/200 |
| 5,025,373 A | 6/1991 | Keyser, Jr. et al. | 364/408 |
| 5,220,501 A | 6/1993 | Lawlor et al. | 364/408 |
| 5,231,571 A | 7/1993 | D'Agostino | 364/408 |
| 5,283,829 A | 2/1994 | Anderson | 380/24 |
| 5,287,270 A | 2/1994 | Hardy et al. | 364/408 |
| 5,325,290 A | 6/1994 | Cauffman et al. | 364/401 |
| 5,326,959 A | 7/1994 | Perazza | 235/379 |
| 5,336,870 A | 8/1994 | Hughes et al. | 235/379 |
| 5,341,429 A | 8/1994 | Stringer et al. | 380/23 |
| 5,347,632 A | 9/1994 | Filepp et al. | 395/200 |
| 5,383,113 A | 1/1995 | Kight et al. | 364/401 |
| 5,420,405 A | 5/1995 | Chasek | 235/379 |
| 5,465,206 A | 11/1995 | Hilt et al. | 364/406 |
| 5,483,445 A | 1/1996 | Pickering | 364/406 |

(Continued)

FOREIGN PATENT DOCUMENTS

WO US98/17329 8/1998

OTHER PUBLICATIONS

Gregg, Leigh, "CUs plan electronic bill payment", Credit Union Executive, v37, n6, p. 4(6), Nov.-Dec. 1997.*

(Continued)

*Primary Examiner*—Nga Nguyen
(74) *Attorney, Agent, or Firm*—Sutherland Asbill & Brennan LLP

(57) ABSTRACT

An electronic bill payment network includes a plurality of user network stations associated with different users, a plurality of biller network stations associated with different billers, and a central network station. A first user station operates, in real time, to transmit information relevant to an amount of an available bill and an instruction to pay the available bill. A first biller station operates, in real time, to receive the transmitted information and to compute the amount of the available bill based upon the received information. The central network station operates to receive the computed amount of the available bill and the transmitted pay instruction, and to direct payment of the computed amount of the available bill based upon the transmitted instruction to pay that bill.

23 Claims, 30 Drawing Sheets

U.S. PATENT DOCUMENTS

| | | | | |
|---|---|---|---|---|
| 5,594,910 | A | | 1/1997 | Filepp et al. ................. 395/800 |
| 5,649,117 | A | | 7/1997 | Landry ........................ 395/240 |
| 5,655,089 | A | | 8/1997 | Bucci .......................... 395/240 |
| 5,671,279 | A | * | 9/1997 | Elgamal ....................... 705/79 |
| 5,699,528 | A | | 12/1997 | Hogan ......................... 395/240 |
| 5,710,889 | A | | 1/1998 | Clark et al. .................. 395/244 |
| 5,727,249 | A | | 3/1998 | Pollin .......................... 705/40 |
| 5,768,521 | A | * | 6/1998 | Dedrick ....................... 705/400 |
| 5,963,925 | A | * | 10/1999 | Kolling et al. ................. 705/40 |
| 6,044,362 | A | * | 3/2000 | Neely ........................... 705/34 |
| 6,049,786 | A | | 4/2000 | Smorodinsky |
| 6,128,603 | A | * | 10/2000 | Dent et al. .................... 705/40 |
| 6,289,322 | B1 | * | 9/2001 | Kitchen et al. ................. 705/40 |
| 6,292,789 | B1 | | 9/2001 | Schutzer |
| 6,304,857 | B1 | * | 10/2001 | Heindel et al. ................. 705/34 |
| 6,334,116 | B1 | * | 12/2001 | Ganesan et al. ............... 705/34 |

OTHER PUBLICATIONS

Moynihan et al., "Taming the remittance beast electronically", Healthcard Financial Management, v46, n3, p. 20(9), Mar. 1992.*

Slater et al., Giving receivables an 'outside' chance, Healthcard Financial Management, v45, n10, p. 56(6), Oct. 1991.*

Open Financial Exchange Bill Presentment, Jun. 12, 1997, 1997 CheckFree Corp., Intuit Inc., Microsoft Corp., pp. 312-356.

* cited by examiner

ELECTRONIC BILLING WITH UPDATEABLE ELECTRONIC BILL SUMMARY

RELATED APPLICATIONS

This application is a continuation-in-part of application Ser. No. 09/017,169, entitled "Distributed Data Accessing Technique", filed Feb. 2, 1998 now U.S. Pat. No. 6,055,567.

FIELD OF THE INVENTION

The present invention relates to electronic bill presentment and more particularly to electronic billing with updateable electronic bill summary presentment.

BACKGROUND OF THE INVENTION

There are two prevalent models for electronic bill presentment that are currently used in industry. The first is an aggregation model 10, which is shown in FIG. 1. In its simplest form, the aggregation model 10 includes a customer 12, an aggregator 14, and a plurality of billers 16. The customer 12 can be, for example, an individual person, a family, or a business. The aggregator 14 can be a financial institution (FI) such as, for example, a bank. Alternatively, the aggregator 14 can be a separate entity which acts of behalf of a sponsor 18, which can also be an FI such as a bank. Each biller 16 can be of any billing institution type such as, for example, a local telephone company, a local electric company, a retail outlet, or a national long distance telephone company.

Each biller 16 provides customer-related invoice data to the aggregator 14. The aggregator 14 serves as an intermediary between each biller 16 and the customer 12 by providing bill presentment directly to the customer 12, potentially on behalf of the sponsor 18.

There are two variants of the aggregation model 10 resulting from the ownership, or "branding": of the presentation experience and the communication channel between the aggregator 14 and the customer 12. In one variant, the aggregator 14 may offer aggregator-branding, thus totally owning both the presentation experience and the communication channel between the aggregator 14 and the customer 12. In the other variant, the aggregator 14 may offer sponsor-branding, thus staying "behind the scenes" in terms of the presentation experience and supporting the communication channel between the aggregator 14 and the customer 12 on behalf of the sponsor 18.

The second prevalent model for electronic bill presentment is a biller direct model 20, which is shown in FIG. 2. In its simplest form, the biller direct model 20 includes a customer 12 and at least one biller 16. In the biller direct model 20, each biller 16 retains the customer-related invoice data and the full relationship with the customer 12 (i.e., the presentation experience and the communication channel). The customer 12 may have software for providing a capability similar to Web browser bookmarking so as to allow easy navigation between billers, and thus some level of virtual aggregation. However, there is no actual aggregation such as with the aggregator 14 of the aggregation model 10 described above.

The above-described models present a dichotomy between a sponsor-centric view and a biller-centric view of bill presentment. That is, the aggregation model 10 allows the aggregator 14 and/or the sponsor 18 to use customer-related invoice data, bill presentment, and the communication channel between the aggregator 14 and the customer 12 for cross-selling or other peripheral services. The biller direct model 20, on the other hand, insures that control of customer-related invoice data, bill presentment, and the communication channel between the biller 16 and the customer 12 remains with the biller 16.

Also, neither of the above-described models adopts a truly customer-centric view. That is, neither of the above-described models allow a customer 12 to interact directly with individual billers 16 while retaining the benefits of interacting with a single aggregator 14 such as, for example, the ability to retain a single authentication and log-in procedure and a common bill presentation framework. Further, neither of the above-described models allow a customer 12 to retain the benefits of interacting with a single aggregator 14 while allowing the aggregator 14, billers 16, and sponsor 18 to retain certain preferences such as, for example, the ability to retain control of customer-related data and a communication channel with each customer 12. Accordingly, it would be desirable to provide a more flexible data accessing technique.

OBJECTS OF THE INVENTION

One object of the present invention is to provide a distributed data accessing technique that allows a customer to interact directly with individual billers while retaining the benefits of interacting with a single aggregator.

Another object of the present invention is to provide a distributed data accessing technique that allows a customer to retain the benefits of interacting with a single aggregator while allowing the aggregator, billers, and sponsor to retain control of customer-related data and a communication channel with each customer.

Another object of the present invention is to provide a real time distributed data accessing technique that ensures payments of the correct bill amount.

The above-stated objects, as well as other objects, features, and advantages, of the present invention will become readily apparent from the following detailed description which is to be read in conjunction with the appended drawings.

SUMMARY OF THE INVENTION

In accordance with the invention, an electronic bill payment network includes a plurality of biller network stations each associated with a different biller, a plurality of user network stations each associated with a different user, and a central network station. Real time network communications is used to transfer information between the applicable user network station, applicable biller network station and the central network station. As used herein, the phase "real time" is defined to mean during a single on-line session involving a user seeking to view and, if desired, pay a bill.

More particularly, a first user network station, associated with a first of the users, is operable, in real time, to transmit information relevant to an amount of an available bill. The transmitted information could, for example, be a gas or electric meter reading, of the amount of product ordered or used etc., which is required to determine, e.g. compute, the amount of the bill. Alternatively, the relevant information could be indicative of a disputed portion of a previously computed bill amount. In the latter case, the amount which will be determined could, for example, reflect a requested adjustment to the previously computed bill amount.

A first biller network station, associated with a first of the billers, is operable, in real time, to receive the transmitted information and to determine the amount of the available bill based upon the received information. As discussed above, this may be either a first determination of the bill amount or a determination of an adjusted bill amount.

The central network station is operable, again in real time, to receive the determined amount of the available bill. The central station is also operable to receive a pay instruction transmitted by the first user network station, and to direct payment of the determined amount of the bill based upon the transmitted instruction to pay that bill. The pay instruction and the determined amount may be transmitted from either the user or biller network station in a single or separate communications, or respectively from the user and biller network stations.

Preferably, a database stores bill availability information identifying available bills of the different billers for the different users, and the central network station is operable to transmit the bill availability information to the user network stations. The bill availability information may beneficially include the amount of each of the identified bills. If so desired, the availability information may also include other bill summary information, although this is not mandatory. Advantageously, the transmitted stored availability information includes an indicator which identifies those of the identified available bills which require information relevant to determining the total amount of those bills. The database may also be configured to store, typically under the direction of the central station processor, any previously determined bill amount and the newly determined bill amount.

In an exemplary operating sequence, the central station transmits two or more of the available bills to the first user network station. The first user network station is operable to receive the transmitted bill availability information. Normally, this information is displayed by the first user station to the first user. The first user station is also operable to select a particular bill from the identified bills, typically based upon an input from the user. A request for the applicable bill is then transmitted by the first user station based upon the selection. If the selected bill is a bill of a first biller for the first user, the network station associated with the first biller operates, in real time, to transmit either a request for the information relevant to the bill amount or the available bill including a previously computed bill amount, as applicable. Preferably, the central station also receives a communication, from the first biller station, indicative of the available bill having been requested from the first biller.

It will also be recognized by those skilled in the art, that the invention is easily implemented using computer software. More particularly, software can be easily programmed, using routine programming skill, based upon the description of the invention set forth herein and stored on a computer readable storage medium which is readable by a computer processor of the applicable system component, e.g. a user, a biller or a central network station to cause the processor to operate such that the particular station operates in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
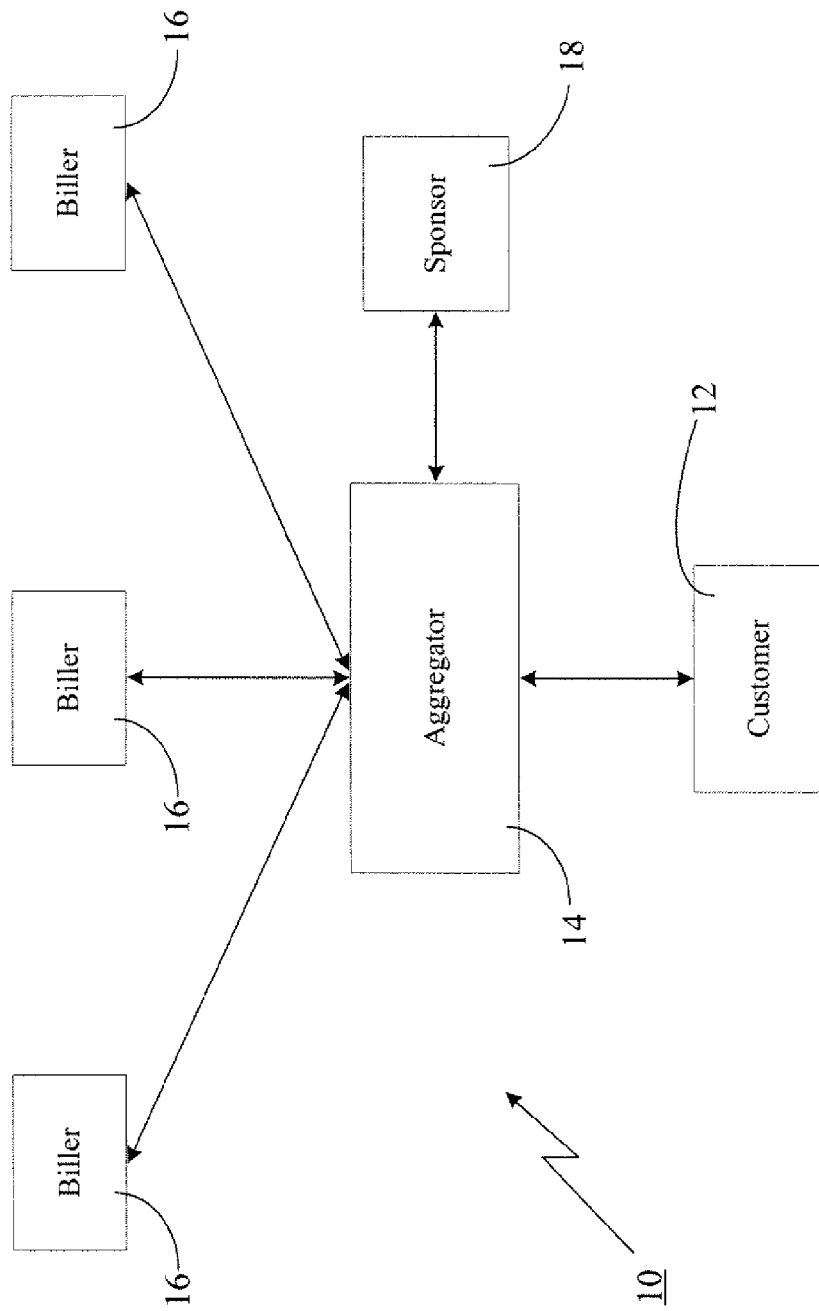
FIG. 1 is an aggregation model for electronic bill presentment.
Figure 2:
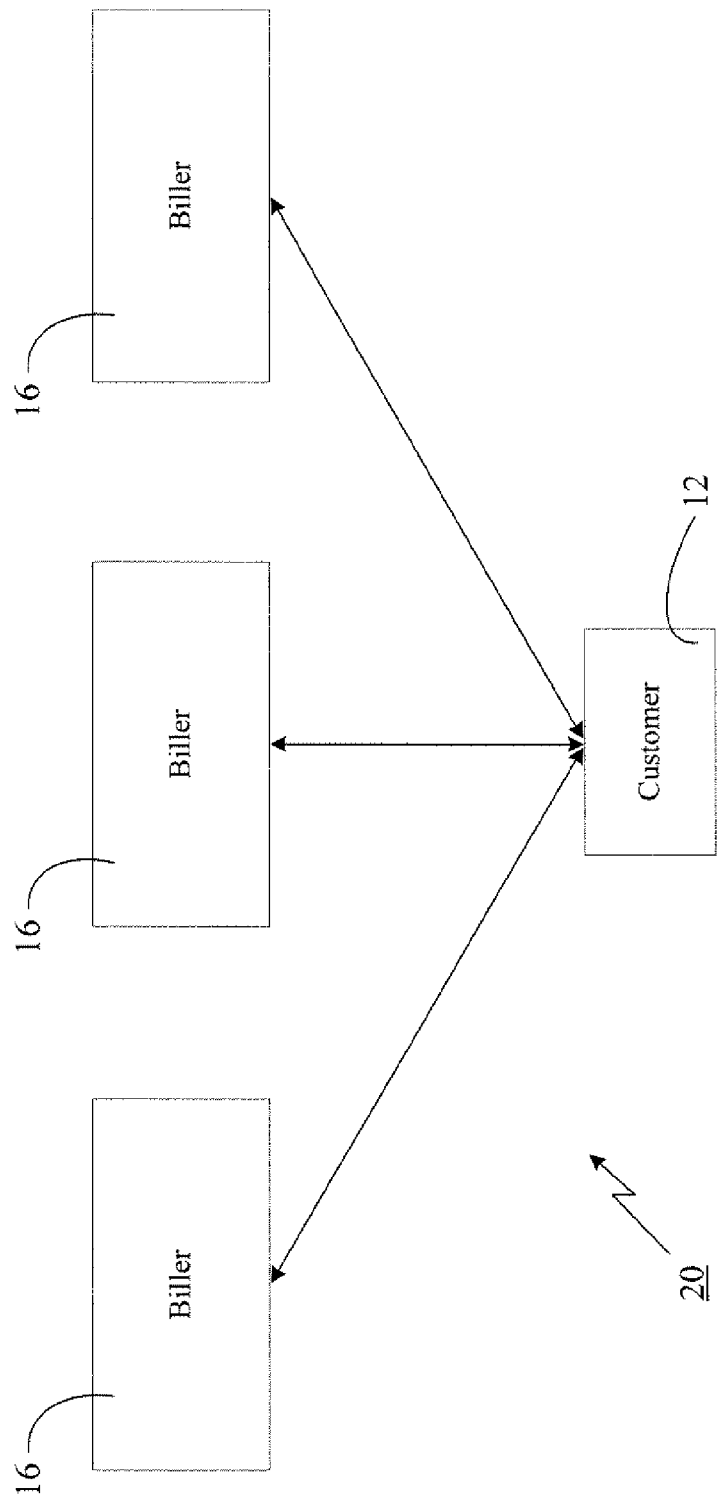
FIG. 2 is a biller direct model for electronic bill presentment.
Figure 3:
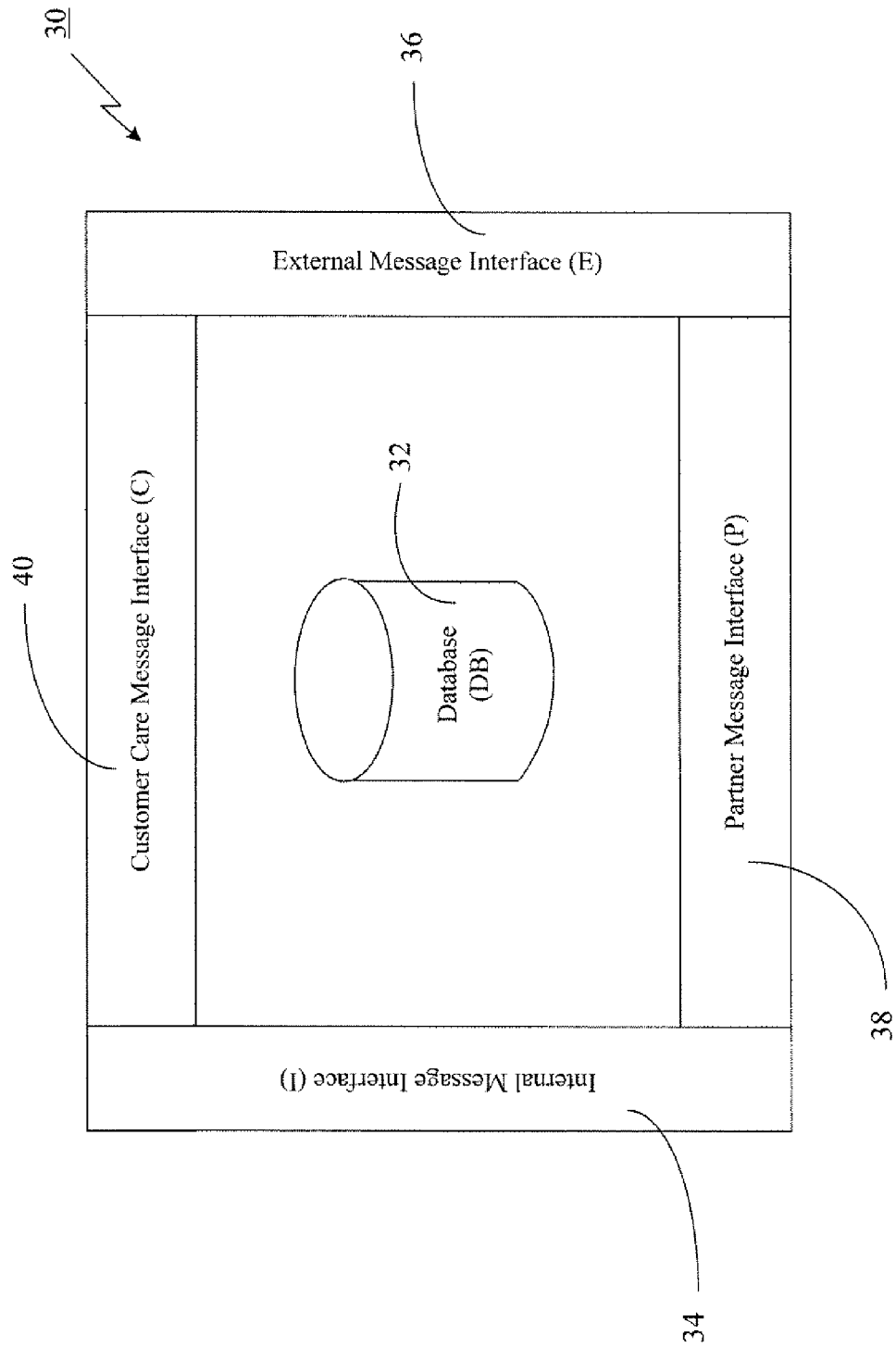
FIG. 3 is an infrastructure diagram of a distributed database entity in accordance with the present invention.

Referring to FIG. 3, there is shown an infrastructure diagram of a distributed database entity 30 in accordance with the present invention. The distributed database entity 30 comprises a database component 32 and a plurality of message interfaces 34-40 for facilitating communication between the database component 32 and other distributed database entities and system components. The database component 32 typically contains data that is controlled or "owned" by the controller or "owner" of the distributed database entity 30. For example, if the distributed database entity 30 is owned by a financial institution (FI) such as a bank, then the database component 32 could contain information such as checking and savings account balances. It should be noted, however, that the database component 32 can also contain data from other distributed database entities and system components, as will be described in detail below.

The plurality of message interfaces 34-40 includes an internal message interface 34, an external message interface 36, a partner message interface 38, and a customer care message interface 40. The internal message interface 34 defines messages that are used to communicate and query data between the given distributed database entity 30 and other distributed database entities, or other system components having an internal message interface. For example, in a bill presentment and payment system, communication between a banking entity and a billing entity may be required. The external message interface 36 defines messages that are used to communicate and query data between the given distributed database entity 30 and any existing system(s) that are directly related to the given distributed database entity 30. For example, an FI such as a bank can have an existing direct deposit account (DDA) system. The partner message interface 38 defines messages that are used to communicate and query data between the given distributed database entity 30 and any existing system(s) that are indirectly related to the given distributed database entity 30. For example, in a bill presentment and payment system, communication with an established billing aggregator may be necessary to satisfy customer demands. The customer care message interface 40 defines messages that are used to communicate and query data between the given distributed database entity 30 and a customer care entity. For example, in a bill presentment and payment system, a billing entity may allow a third party to access bill data in order to provide feedback to bill customers. It should be noted that all of the above-described interfaces will be described in greater detail below.

Figure 4:
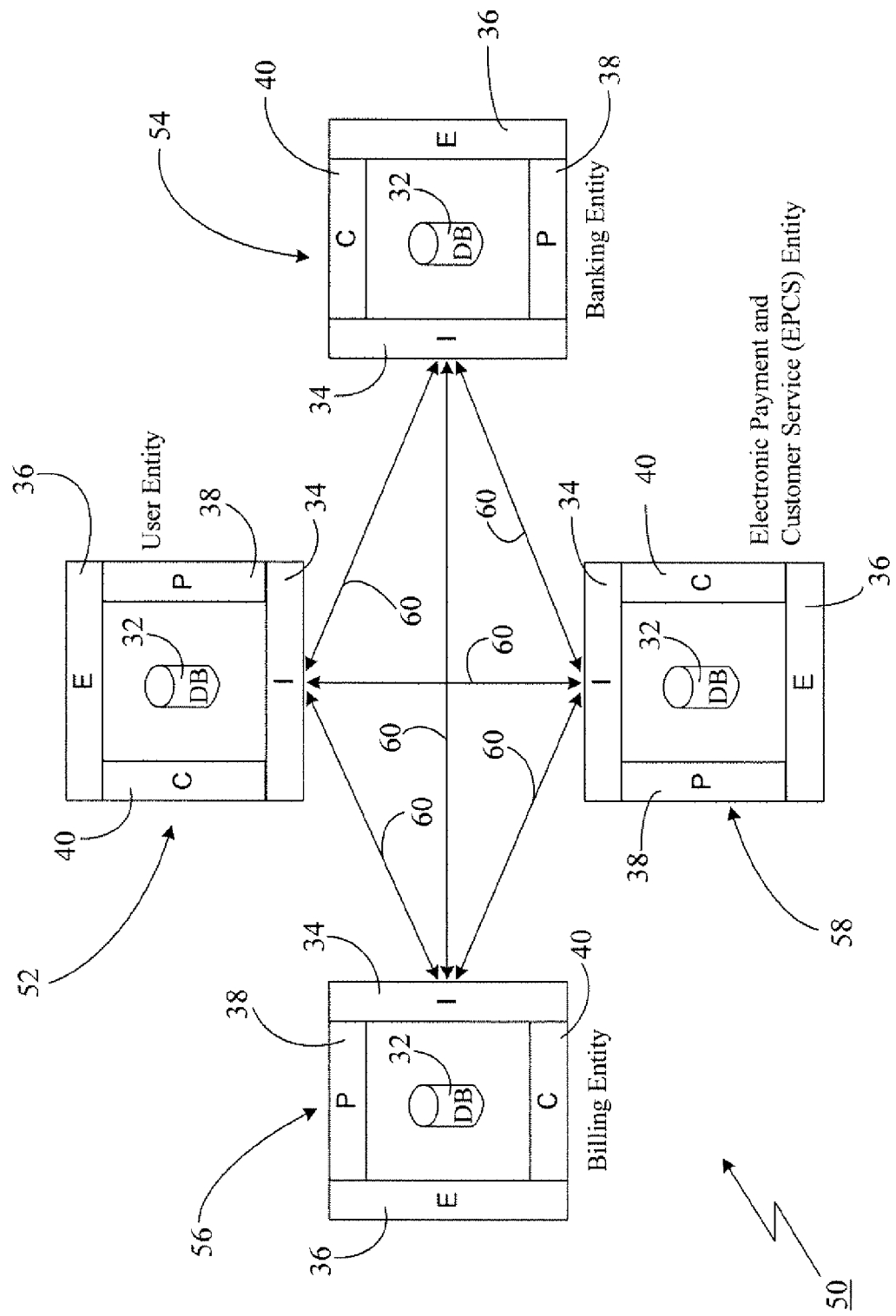
FIG. 4 is a schematic diagram of an electronic bill presentment and payment system in accordance with the present invention.

Referring to FIG. 4, there is shown a schematic diagram of a versatile electronic bill presentment and payment system 50 in accordance with the present invention. The system 50 comprises a user entity 52, a banking entity 54, a billing entity 56, and an electronic payment and customer service (EPCS) entity 58. For purposes of this detailed description, the user entity 52, the banking entity 54, the billing entity 56, and the EPCS entity 58 are each distributed database entities 30 as defined above. Thus, the user entity 52, the banking entity 54, the billing entity 56, and the EPCS entity 58 each has a database component 32, an internal message interface 34, an external message interface 36, a partner message interface 38, and a customer care message interface 40. It should be noted, however, that the user entity 52, the banking entity 54, the billing entity 56, and the EPCS entity 58 are not required to have a database component 32, an internal message interface 34, an external message interface 36, a partner message interface 38, and a customer care message interface 40. That is, the user entity 52, the banking entity 54, the billing entity 56, and the EPCS entity 58 are only required to have an internal message interface 34 so that communications can take place between each entity.

At this point it should be noted that, although only a single user entity 52, banking entity 54, billing entity 56, and EPCS entity 58 is shown in the system 50, it is common to have a plurality of such entities in an actual versatile electronic bill presentment and payment system in accordance with the present invention.

As previously described, an internal message interface 34 defines messages that are used to communicate and query data between distributed database entities. Thus, since the user entity 52, the banking entity 54, the billing entity 56, and the EPCS entity 58 are all distributed database entities, they all communicate through internal message interfaces 34. The communications are performed over interconnections 60, which can be electrical wire, optical fiber, or microwave-based interconnections.

At this point it should be noted that each internal message interface 34, as well as each external message interface 36, partner message interface 38, and customer care message interface 40, can be implemented using any number of existing message-based communication systems such as, for example, a TCP/IP message-based communication system running on the infrastructure of the internet. Alternatively, the internal message interfaces 34, the external message interfaces 36, the partner message interfaces 38, and the customer care message interfaces 40 could be implemented with proprietary messaging software on a private network or intranet. It should also be noted that there are no requirements as to the nature of the messaging protocol, or any middleware used to support the messaging.

The user entity 52 is typically a personal computer (PC) that is directly connected to the system 50, or is connected to the system 50 through a network server. Thus, the database component 32 associated with the user entity 52 can be located on the PC (e.g., a traditional "fat" client), or on the network server (e.g., an HTML browser client). It should be noted that the database component 32 associated with the user entity 52 can also be located in one of the other distributed database entities, which can download data to the user entity 52 (e.g., a Java client). It should also be noted that the database component 32 associated with the user entity 52 can be distributed among all three of the above-listed locations, owing to the distributed nature of each database component 32. Thus, each database component 32 should not be thought of as a single, monolithic database. Rather, each database component 32 is better described as a distributed repository of data categorized by the entity that "owns" the data.

Wherever it is located, the database component 32 associated with the user entity 52 stores data that is related to the type of user interface (UI) that is being presented to a subscriber of the system 50. For example, the database component 32 associated with the user entity 52 can store data that is related to the particular type of presentation technology being used (e.g., a "fat" client, an HTML browser client, or a Java client), a specific application, or a particular version. The database component 32 associated with the user entity 52 can also store data that is related to a particular computing session such as, for example, the existence of a computing session and/or the duration of a computing session. The database component 32 associated with the user entity 52 can further store subscriber authentication data, which is described in detail below.

The main function of the user entity 52 is to build a UI using data obtained from the other distributed database entities, and then present the UI to a subscriber of the system 50. The presentation of the UI to a subscriber is dependent upon the particular type of presentation technology being used (e.g., a "fat" client, an HTML browser client, or a Java client). For example, a UI for a Java client requires that presentation data be downloaded from one of the other distributed database entities.

Other functions of the user entity 52 include storing certain data locally so as to facilitate off-line editing and viewing, maintaining a state in a connectionless environment (e.g., an HTTP environment), and sensing the availability of software updates and managing their subsequent application. All of these functions depend on the nature of the client (e.g., a "fat" client, an HTML browser client, or a Java client). As previously indicated, another function of the user entity 52 includes storing subscriber authentication data (e.g., a security ticket) that is used to gain access to other distributed database entities in the system 50.

The banking entity 54, which is typically an FI such as, for example, a bank, is generally viewed as a primary point of presence for a subscriber to the system 50, typically providing an appearance of aggregation to the subscriber. This view is held primarily due to the trust that consumers typically place in a bank brand, and the fact that bank customers who already bank online are also likely to want to receive bills online. Thus, in the following discussion, the banking entity 54 is assumed to be the aggregator of the system 50. It should be noted, however, that any one of the other entities could also be the aggregator of the system 50 in accordance with the present invention. There are several factors which can be used to determine aggregator status such as, for example, market clout.

The banking entity 54 typically gains access to the system 50 through a network server. Thus, the database component 32 associated with the banking entity 54 can be located in the network server. It should be noted that the database component 32 associated with the banking entity 54 can also be located in a system associated with the banking entity 54 such as, for example, a DDA system. Such a DDA system could be accessed through the external message interface 36 of the banking entity 54, as described in detail below. It should further be noted that the database component 32 associated with the banking entity 54 can also be located in one of the other distributed database entities, or be distributed among many of the above-mentioned locations, owing to the distributed nature of each database component 32.

Wherever it is located, the database component 32 associated with the banking entity 54 stores bank-specific subscriber profile data profile such as, for example, subscriber names and addresses and subscriber account numbers. The database component 32 associated with the banking entity 54 can also store account information such as, for example, static account information (e.g., lease rate, principle), and dynamic account information (e.g., balance). The database component 32 associated with the banking entity 54 can further store profile data specifically associated with the FI such as, for example, graphics, business rules, banking-related transaction histories, and aggregation relationships such as those between the FI and billers.

Since it is likely that the system 50 will be used with existing banking systems such as, for example, an existing DDA system, one of the main functions of the banking entity 54 is the continuation of current banking and bill payment functionality including the maintaining of customer profiles and already existing interfaces. In its role as aggregator, the banking entity 54 also provides data to the user entity 52 to be used for the creation of a navigation portion of a UI. For an HTML browser client, this data would be used to create a navigation frame, but not a content specific frame. It should be noted that the banking entity 54 can also provide data to the user entity 52 to be used for the creation of a UI for traditional banking and bill payment.

Since the banking entity 54 is generally viewed as the primary point of presence for a subscriber to the system 50, the banking entity 54 also functions as the likely, but not exclusive, entry point for subscriber sign-on. Thus, the banking entity 54 typically controls the sign-on and authentication procedures for subscribers through the user entity 52. It should be noted that the banking entity 54 typically works in conjunction with the EPCS entity 58 in controlling the authentication procedure, as described in detail below.

Another function of the banking entity 54 includes tracking bank related events and storing them in an event tracking database, which is typically associated with the EPCS entity 58, as also described in detail below.

The billing entity 56 is typically a biller such as, for example, a utility company. The billing entity 56 typically gains access to the system 50 through a network server. Thus, the database component 32 associated with the billing entity 56 can be located in the network server. It should be noted that the database component 32 associated with the billing entity 56 can also be located in a system associated with the billing entity 56 such as, for example, a legacy billing system. Such a legacy billing system could be accessed through the external message interface 36 of the billing entity 56, as described in detail below. It should further be noted that the database component 32 associated with the billing entity 56 can also be located in one of the other distributed database entities, or be distributed among many of the above-mentioned locations, owing to the distributed nature of each database component 32.

Wherever it is located, the database component 32 associated with the billing entity 56 stores biller-specific subscriber profile data such as, for example, subscriber names and addresses and subscriber account numbers and types (e.g., business vs. residential phone line). The database component 32 associated with the billing entity 56 also stores billing data for use by the user entity 52 in building the UI for the subscriber. The billing data can include bill availability data, detailed billing data, ads and other cross-sale displays and links, and bill payment terms and conditions.

The database component 32 associated with the billing entity 56 can also store biller transaction history such as, for example, bill data manipulation (e.g., viewing, searching, sorting), and cross-sell events. The database component 32 associated with the billing entity 56 can further store biller profile data such as, for example, graphics, business rules, and relationships with aggregators such as banks.

The main function of the billing entity 56 is to provide billing data to the user entity 52 for use in creating the UI for the subscriber. The billing entity 56 also provides bill availability data to an aggregator database, whether it is located in the banking entity 54, the EPCS entity 58, or another entity, to provide notice of bill availability to subscribers. The billing entity 56 can also access legacy billing systems through the external message interface 36 of the billing entity 56, as indicated above.

Another function of the billing entity 56 includes tracking biller-related events and storing them in an event tracking database, which is typically associated with the EPCS entity 58, as described in detail below.

Figure 5:
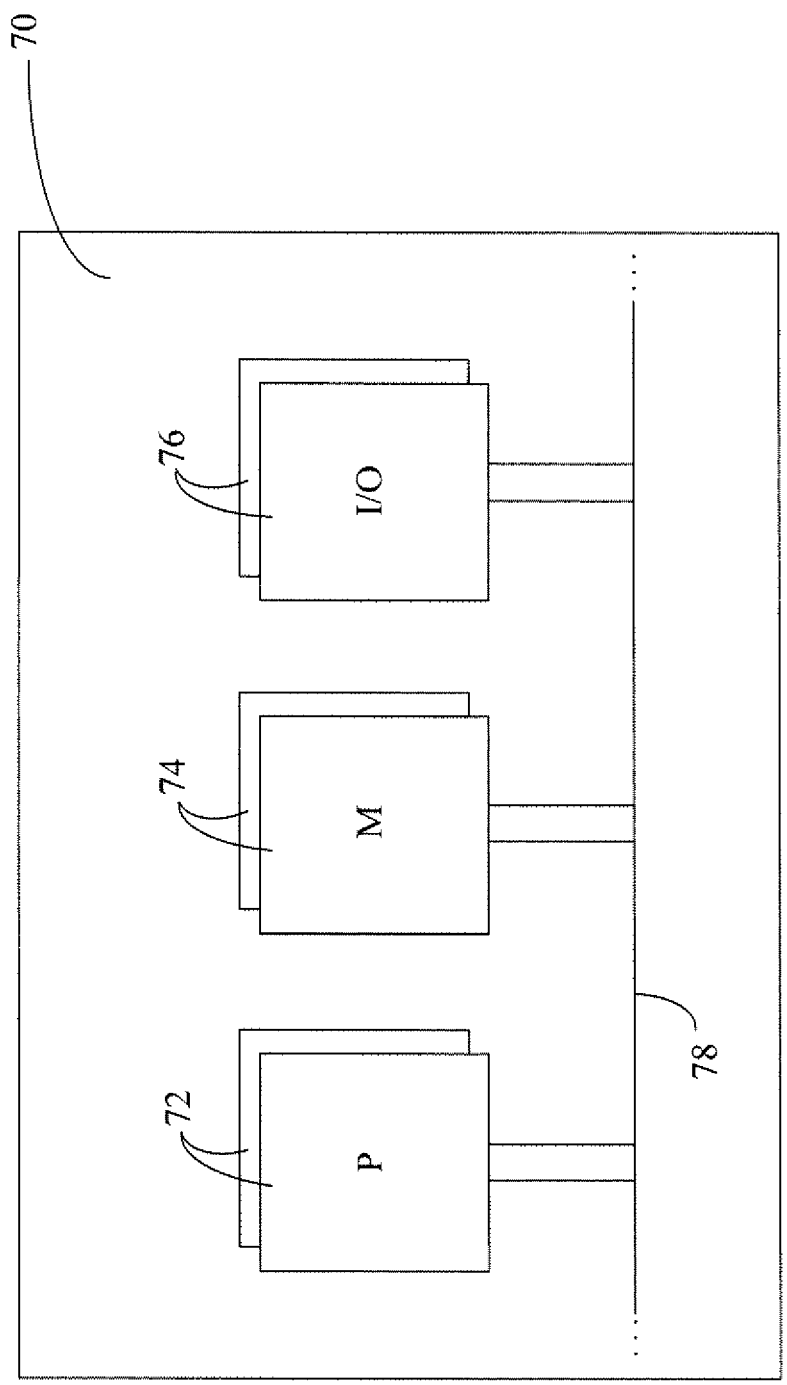
FIG. 5 is a schematic diagram of an electronic payment and customer service (EPCS) entity in accordance with the present invention.

The EPCS entity 58 can generally be described in terms of a data processing system 70, such as shown in FIG. 5. The data processing system 70 preferably comprises at least one processor (P) 72, memory (M) 74, and input/output (I/O) interface 76, which are connected to each other by a bus 78, for implementing the functions of the EPCS entity 58, as described in detail below.

Referring again to FIG. 4, the EPCS entity 58 typically gains access to the system 50 through a network server. Thus, the database component 32 associated with the EPCS entity 58 can be located in the network server. It should be noted that the database component 32 associated with the EPCS entity 58 can also be located in a system associated with the EPCS entity 58 such as, for example, a legacy aggregating system. Such a legacy aggregating system could be accessed through the external message interface 36 of the EPCS entity 58, as described in detail below. It should further be noted that the database component 32 associated with the EPCS entity 58 can also be located in one of the other distributed database entities, or be distributed among many of the above-mentioned locations, owing to the distributed nature of each database component 32.

Wherever it is located, the database component 32 associated with the EPCS entity 58 stores bill payment-specific subscriber profile data such as, for example, subscriber names and addresses, subscriber DDA account numbers, and subscriber credit ratings. The database component 32 associated with the EPCS entity 58 also stores bill payment warehouse data such as, for example, user-specific payees, single occurrence payments, and recurring payments/models.

As previously described, both the banking entity 54 and the billing entity 56 track and store events in an event tracking database. This event tracking database is typically located in the database component 32 associated with the EPCS entity 58. The event tracking data that is stored typically comprises event summaries and links to other databases, perhaps residing at other entities, which provide event details and/or an audit trail.

The database component 32 associated with the EPCS entity 58 also stores bill payment transaction histories, and system subscriber profile data such as, for example, metadata about subscribers and metadata about subscribers' relationships to other entities (e.g., a list of billers that a subscriber has enabled). The database component 32 associated with the EPCS entity 58 further stores billing-related profile information on the system aggregator and billers such as, for example, metadata about billing arrangements (e.g., flat rate, per subscriber, event-driven, etc.), and aggregation data such as, for example, new bill availability and messages or special announcements available from the billing entity 56. The database component 32 associated with the EPCS entity 58 still further stores security data such as, for example, required sign-on information and macro-level authorizations. The database component 32 associated with the EPCS entity 58 additionally stores customer service data such as, for example, FAQ's, FI and biller contact information, and problem resolution data.

The EPCS entity 58 is the glue that holds the distributed database entities together. The EPCS entity 58 accomplishes this by functioning as an integration agent by maintaining bill payment profiles and warehouse data, aggregating bill availability and status data (but not bill content or presentation), and maintaining an event tracking database (or audit trail) that can be accessed by all of the database entities. Also, in order to facilitate a single point of sign-on, the EPCS entity 58 functions as the authentication gate keeper. This doesn't mean to imply that the EPCS entity 58 necessarily maintains user identification numbers and/or passwords. However, it does imply that the EPCS entity 58 accepts sign-on requests and doles out authentication "tickets" in response, in conjunction with the banking entity as described above.

It should be noted that, like user identification numbers and passwords, other data elements, like event details, may end up being virtually aggregated by the EPCS entity 58, but may still physically reside in a distributed manner across several of the database entities.

It should also be noted that the EPCS entity 58 may also route e-mail messages to and from the various database entities, as well as store e-mail messages sent to and from the various database entities.

As previously described, an internal message interface 34 defines messages that are used to communicate and query data between distributed database entities. As also previously described, each internal message interface 34 can be implemented using any number of existing message-based communication systems, or with proprietary messaging software on a private network or intranet. Furthermore, the message specification or file format can be either standard (i.e., open) or proprietary. With this mind, the following types of messages are examples of messages which may be employed to implement an internal message interface 34 in accordance with the present invention.

Depending upon the nature of the presentation technology being used (e.g., a "fat" client, an HTML browser client, or a Java client), the user entity 52 may need to process an internal message to store a security ticket for later use in gaining access to other distributed database entities in the system 50. The user entity 52 may also need to process an internal message to update any resident software. The user entity 52 may further need to process an internal message containing various types of information (assuming a push model). The user entity 52 may additionally need to process internal e-mail messages such as, for example, those for receiving data from other database entities.

The banking entity 54 will process an internal message to add/update/delete/retrieve FI branding information, as well as an internal message to add/update/delete an entry from a list of billers that have been aggregated. The banking entity 54 will also process an internal message to activate a subscriber for home banking via a messaging protocol, which can be an existing messaging protocol such as, for example, OFX or a batch process. The banking entity 54 will further process an internal message to query/update bank subscriber profile data for purposes of customer care. The banking entity 54 will still further process an internal message to query bank transaction history for customer care and for linking to the event tracking database. The banking entity 54 will still further process an internal message to retrieve a list of billers available under the FI sponsor umbrella. An alternative to this is to place the list of billers available under the FI sponsor umbrella in an aggregation database. However, placing the list of billers available under the FI sponsor umbrella allows the EPCS entity 58 to tailor the list by FI sponsor. The banking entity 54 will additionally process internal e-mail messages such as, for example, those for sending data to other database entities, receiving data from other database entities, and broadcasting data to other database entities.

The billing entity 56 will process an internal message to add/update/delete/retrieve biller branding information, as well as an internal message to activate a subscriber for electronic bill presentment via a messaging protocol, which can be an existing messaging protocol such as, for example, OFX or a batch process. The billing entity 56 will also process an internal message to retrieve bill availability data, retrieve bill detail data, and retrieve bill presentation specifications or content. For example, the retrieved data could be URL links to ads and notices, HTML data, or OFX data. The billing entity 56 will further process an internal message to query/update biller subscriber profile data for purposes of customer care. The billing entity 56 will still further process an internal message to query biller transaction history for customer care and for linking to the event tracking database. The billing entity 56 will additionally process internal e-mail messages such as, for example, those for sending data to other database entities, receiving data from other database entities, and broadcasting data to other database entities.

The EPCS entity 58 will process internal event tracking messages. Such event tracking messages are used to gain access to two types of information in the event tracking database: summary data and a link to another database entry that can provide more detail. Such detail includes subscriber enrollment data, subscriber service activation data (e.g., biller, bill payment, banking, etc.), sign-on data, bill availability data, bill viewed data, bill payment generated data (optionally associated with presented bill data), subsequent bill payment events data (e.g., submitted, processed, failed, cleared, remittance received by biller, etc.), cross-sell events data (e.g., ad/offer viewed, ad/offer clicked, product/service purchased), terms & conditions viewed data, e-mail created/read/deleted data.

The EPCS entity 58 will also process an internal messages related to subscriber profile data such as, for example, to add/modify/delete/read subscriber profile data, often as a function of the events listed above (e.g., enrollment, activation, etc.).

The EPCS entity 58 will also process internal security messages. Such internal security messages may relate to authentication, which result in the EPCS entity 58 issuing a security ticket. It should be noted that an authentication request does not have to come as a result of a subscriber "surfing" to the network server of the banking entity 54. It may be initiated if a subscriber tries to gain access to the billing entity 56, and thereby not even contacting the banking entity 54. The point being that with a security ticket a subscriber is generally allowed to freely traverse any database entity in the system 50 without going through repeated sign-on procedures.

An internal security message may also relate to macro-level authorization, wherein a security ticket may contain the credentials to allow a subscriber access to a particular billing entity, but doesn't address micro-level authorization issues such as allowed operations.

An internal security message may also relate to getting a security ticket without authentication. Such a message will originate from a trusted party (e.g., an FI performing its own authentication). Therefore, a security ticket is provided without performing an authentication.

It should be noted that the use of a security ticket enables, but does not mandate, a single sign-on procedure. In other words, a database entity such as, for example, the billing entity 56 may, for whatever reason, require additional authentication information.

The EPCS entity 58 will further process internal messages relating to aggregation data. For example, an EPCS entity 58 will process an internal message to create a link to summary or detailed bill information, or to create a link to message, notice, ad, or some other kind of non-bill information that is available from the billing entity 56.

The EPCS entity 58 will still further process an internal message to query/update bill payment transaction history for purposes of customer care.

The EPCS entity 58 will additionally process internal e-mail messages such as, for example, those associated with routing e-mail, picking-up e-mail, and querying and e-mail mailbox.

The EPCS entity 58 may also process internal messages related to data mining. Such messages are handled very carefully with respect to privacy, perhaps even providing an ACL or other mechanisms to ensure privacy. The results of such messages may be delivered out of band (e.g., by batch).

As previously described, an external message interface 36 defines messages that are used to communicate and query data between a given distributed database entity 30 and any existing system(s) that are directly related to the given distributed database entity 30. As also previously described, each external message interface 36 can be implemented using any number of existing message-based communication systems, or with proprietary messaging software on a private network or intranet. Furthermore, the message specification or file format can be either standard (i.e., open) or proprietary.

Figure 6:
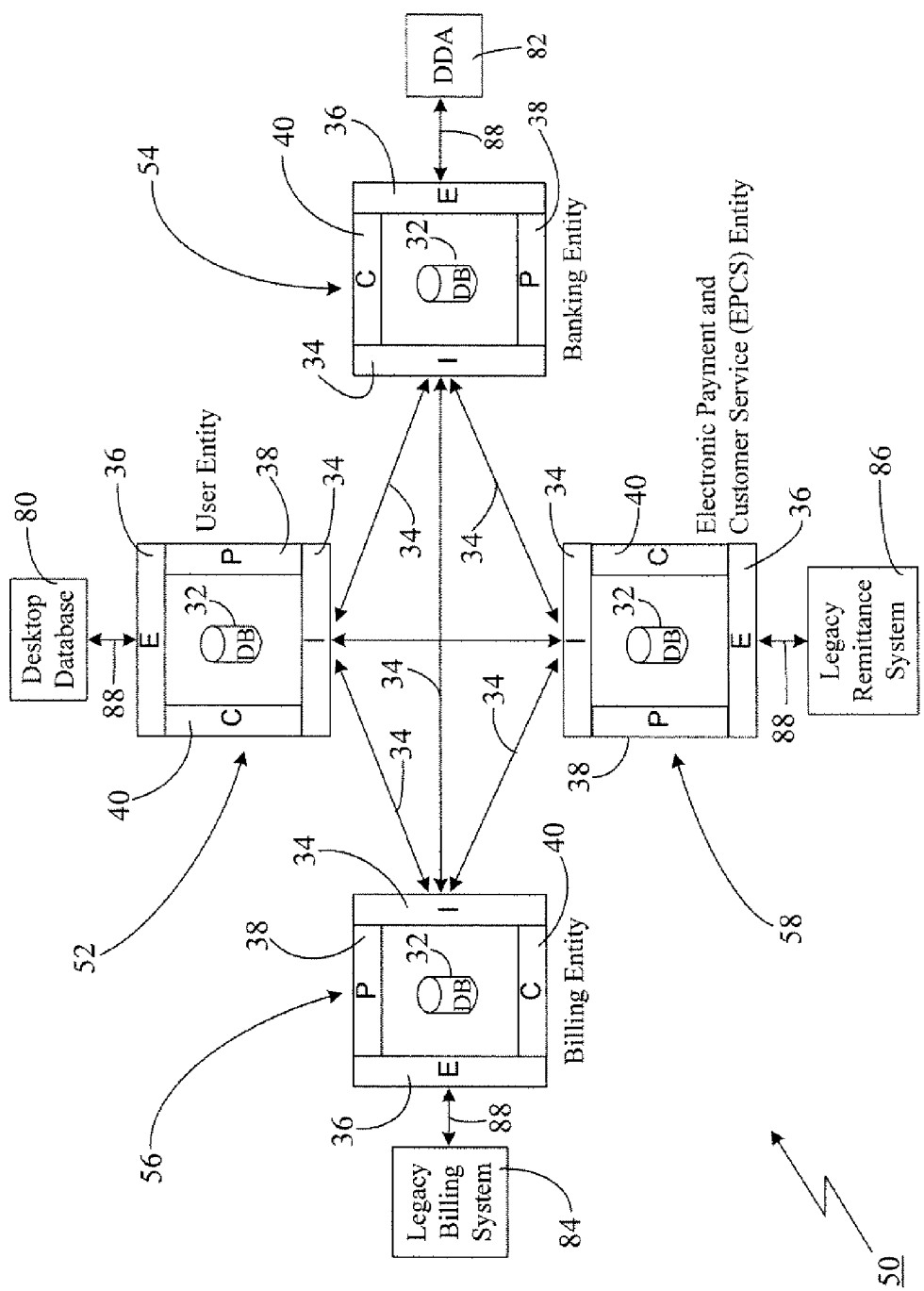
FIG. 6 is a schematic diagram of the electronic bill presentment and payment system shown in FIG. 4, extended to include certain associated directly related systems.

Referring to FIG. 6, there is shown a schematic diagram of the versatile electronic bill presentment and payment system 50, along with some associated directly related systems. The associated directly related systems comprise a desktop database 80, a DDA system 82, a legacy billing system 84, and a legacy remittance system 86. The communications between the various database entities and their associated directly related systems are performed over interconnections 88, which can be electrical wire, optical fiber, or microwave-based interconnections.

Depending upon the nature of the presentation technology being used (e.g., a "fat" client, an HTML browser client, or a Java client), the user entity 52 may need to process an external message in order to communicate with an existing system such as, for example, the desktop database 80. To support such a legacy system, it may be necessary to implement the external message interface 36 of the user entity 52 in the context of an existing, and possibly extended, protocol specification, such as Gold, NPC, or OFX.

The banking entity 54 will process external messages to and from an existing system such as, for example, the DDA system 82 in order to query and update information such as, for example, subscriber profile data, subscriber account data, out-of-band (e.g., ATM) account activity, and statement history. It's also conceivable that the banking entity 54 would need to interface with other banking systems (e.g., stops). Thus, the external message interface 36 of the banking entity 54 is a key feature of the versatile electronic bill presentment and payment system 50.

The billing entity 56 will process external messages to and from an existing system such as, for example, the legacy billing system 84 in order to query and update information such as, for example, subscriber profile data, subscriber account data, account activity, and statement history. Most of this data is industry, if not biller, specific. Thus, the external message interface 36 of the billing entity 56 is a key feature of the versatile electronic bill presentment and payment system 50.

The EPCS entity 58 will process external messages to and from an existing system such as, for example, the legacy remittance system 86. The legacy remittance system 86 could be, for example, ACH, RPP, RPS, or Direct Send.

As previously described, a partner message interface 38 defines messages that are used to communicate and query data between a given distributed database entity 30 and any existing system(s) that are indirectly related to the given distributed database entity 30. As also previously described, each partner message interface 38 can be implemented using any number of existing message-based communication systems, or with proprietary messaging software on a private network or intranet. Furthermore, the message specification or file format can be either standard (i.e., open) or proprietary.

Figure 7:
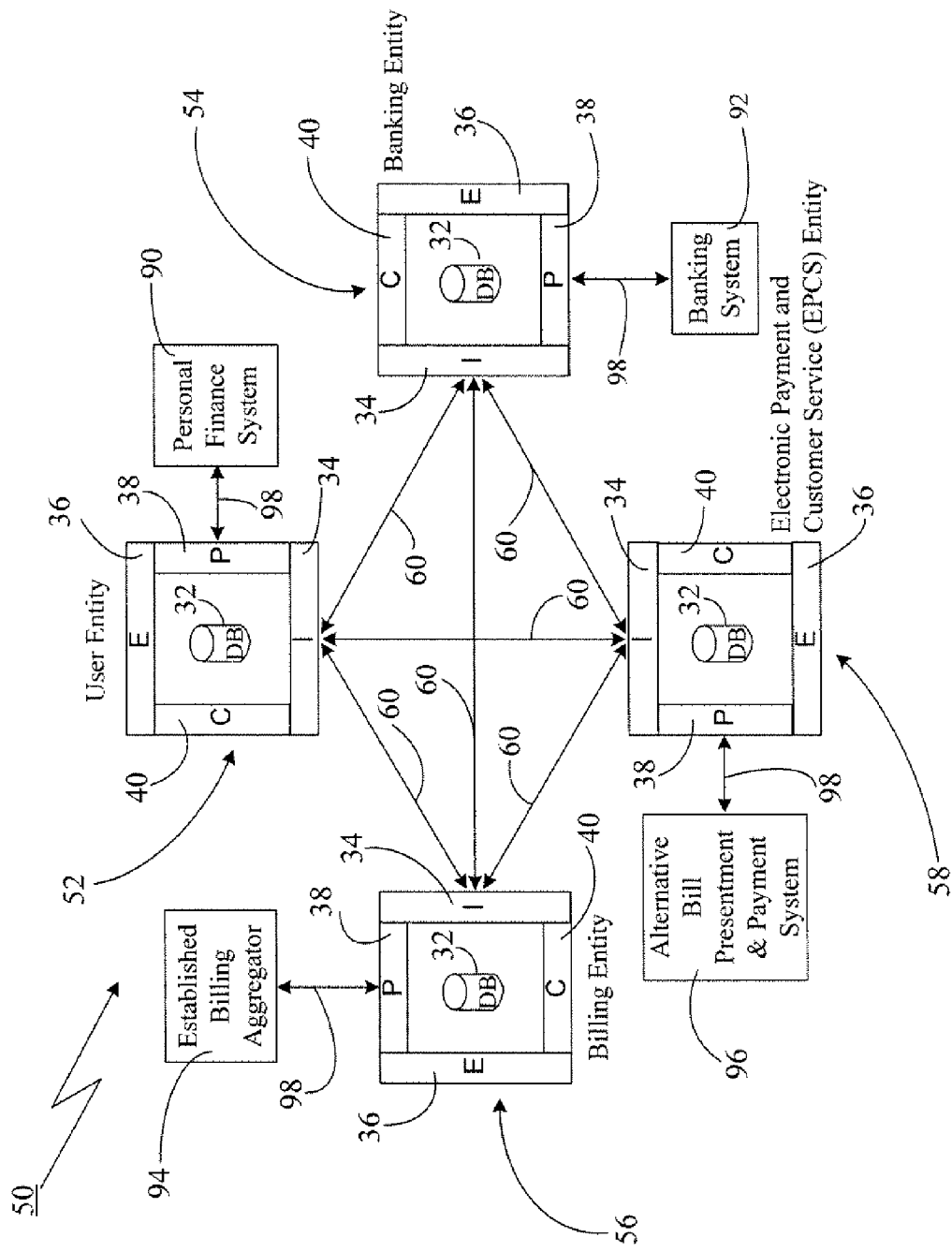
FIG. 7 is a schematic diagram of the electronic bill presentment and payment system shown in FIG. 4, extended to include certain associated indirectly related systems.

Referring to FIG. 7, there is shown a schematic diagram of the versatile electronic bill presentment and payment system 50, along with some associated indirectly related systems. The associated indirectly related systems comprise a personal finance system 90, a banking system 92, an established billing aggregator 94, and an alternative bill presentment and payment system 96. The communications between the various database entities and their associated indirectly related systems are performed over interconnections 98, which can be electrical wire, optical fiber, or microwave-based interconnections.

Depending upon the nature of the presentation technology being used (e.g., a "fat" client, an HTML browser client, or a Java client), the user entity 52 may need to process a partner message in order to communicate with a partner such as, for example, the personal finance system 90. The personal finance system 90 could be, for example, a personal financial manager (PFM) software package such as, for example, Quicken or Money.

The banking entity 54 will process partner messages to and from a partner such as, for example, the banking system 92.

The billing entity 56 will process partner messages to and from a partner such as, for example, the established billing aggregator 94. Such a partner relationship may be required if a large group of subscribers are using the established billing aggregator 94, and thereby have the leverage to demand that all of their bills come through the established billing aggregator 94. The established billing aggregator 94 is essentially treated as a proxy for the billers that it represents. Thus, subscribers to the established billing aggregator 94 will have equal footing as subscribers to the present system 50. This means that subscribers to the established billing aggregator 94 will receive the same event tracking, customer service, and payment processing functionality as subscribers to present system 50. Of course, to gain the additional functionality provided by the present system 50, the established billing aggregator 94, or someone acting on their behalf, will need to provide the same programming support that is required of any biller participating in the present system 50.

To present a bill generated by the established billing aggregator 94, the present system 50 would, for example, receive bill availability data and the URL of a web server of the established billing aggregator 94, and the billing entity 56 would then point to the web server of the established billing aggregator 94 to get an HTML presentation of detailed bill data. In this scenario, the partner message interface 38 would be essentially the same as an internal message interface 34, but possibly with added bulk transfer capability.

The EPCS entity 58 will process partner messages to and from a partner such as, for example, the alternative bill presentment and payment system 96. Such a partner relationship may be required if a billing entity 56 has a subscriber base that is split between using the present system 50 and the alternative bill presentment and payment system 96. In such a scenario, the present system 50 could function as a billing aggregator for the alternative bill presentment and payment system 96, and vice-versa. However, the alternative bill presentment and payment system 96 and its subscribers would not receive any of the benefits of the messaging functionality provided by the present system 50. Only the minimum amount of functionality would be provided. That is, the partner message interface 38 would only provide what is required to present bills through the alternative bill presentment and payment system 96, and not offer any of the advantages provided by the present system 50. The goal being to have the billing entity 56 encourage all of its subscribers to access bills through the present system 50.

It should be noted that the EPCS entity 58 will typically require the capabilities of a billing entity 56 in order to present bills to and from the alternative bill presentment and payment system 96.

As previously described, a customer care message interface 40 defines messages that are used to communicate and query data between a given distributed database entity 30 and a customer care entity. As also previously described, each customer care message interface 40 can be implemented using any number of existing message-based communication systems, or with proprietary messaging software on a private network or intranet. Furthermore, the message specification or file format can be either standard (i.e., open) or proprietary.

Figure 8:
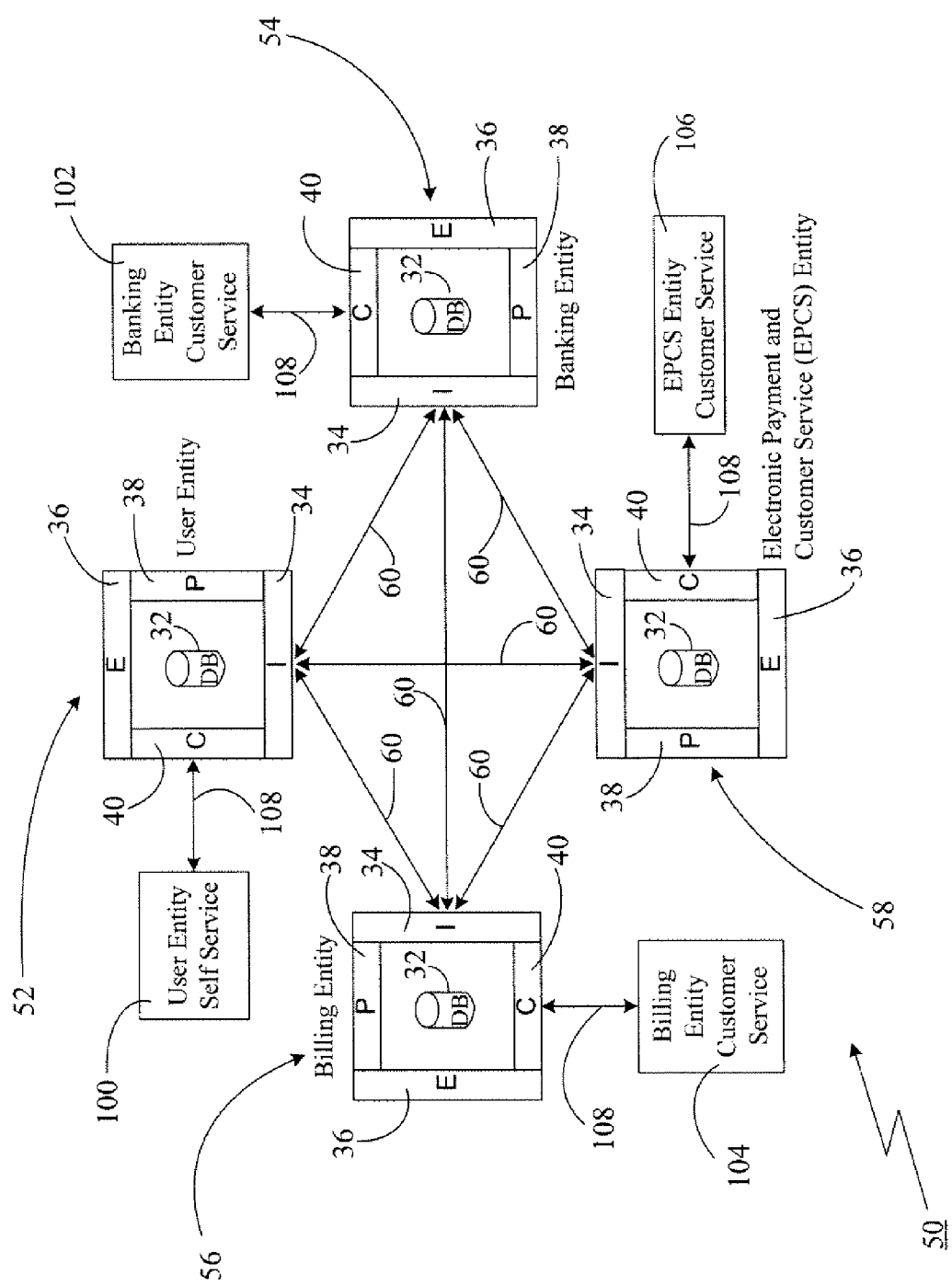
FIG. 8 is a schematic diagram of the electronic bill presentment and payment system shown in FIG. 4, extended to include certain associated customer care entities.

Referring to FIG. 8, there is shown a schematic diagram of the versatile electronic bill presentment and payment system 50, along with some associated customer care entities. The associated customer care entities comprise a user entity self service center 100, a banking entity customer service center 102, a billing entity customer service center 104, and an EPCS customer service center 106. The communications between the various database entities and their associated customer care entities are performed over interconnections 108, which can be electrical wire, optical fiber, or microwave-based interconnections.

Depending upon the nature of the presentation technology being used (e.g., a "fat" client, an HTML browser client, or a Java client), the user entity 52 may need to process a customer care message in order to communicate with a customer care entity such as, for example, the user entity self service center 100. The user entity self service center 100 could be, for example, a self service diagnostic tool.

The banking entity 54 will process customer care messages from a customer care entity such as, for example, the banking entity customer service center 102. A customer care message may be a request for data or a request to modify existing data. The banking entity 54 will process such customer care messages by providing the requested data or providing a confirmation that the existing data has been modified, respectively, to the banking entity customer service center 102. The banking entity customer service center 102 could be, for example, a third party telemarketing group that is allowed access to banking and overall system data in order to provide feedback to system subscribers.

The billing entity 56 will process customer care messages from a customer care entity such as, for example, the billing entity customer service center 104. A customer care message may be a request for data or a request to modify existing data. The billing entity 56 will process such customer care messages by providing the requested data or providing a confirmation that the existing data has been modified, respectively, to the billing entity customer service center 104. The billing entity customer service center 104 could be, for example, a third party telemarketing group that is allowed access to billing and overall system data in order to provide feedback to system subscribers.

The EPCS entity 58 will process customer care messages from a customer care entity such as, for example, the EPCS entity customer service center 106. A customer care message may be a request for data or a request to modify existing data. The EPCS entity 58 will process such customer care messages by providing the requested data or providing a confirmation that the existing data has been modified, respectively, to the EPCS entity customer service center 106. The EPCS entity customer service center 106 could be, for example, a third party telemarketing group that is allowed access to event and overall system data in order to provide feedback to system subscribers.

Figure 9:
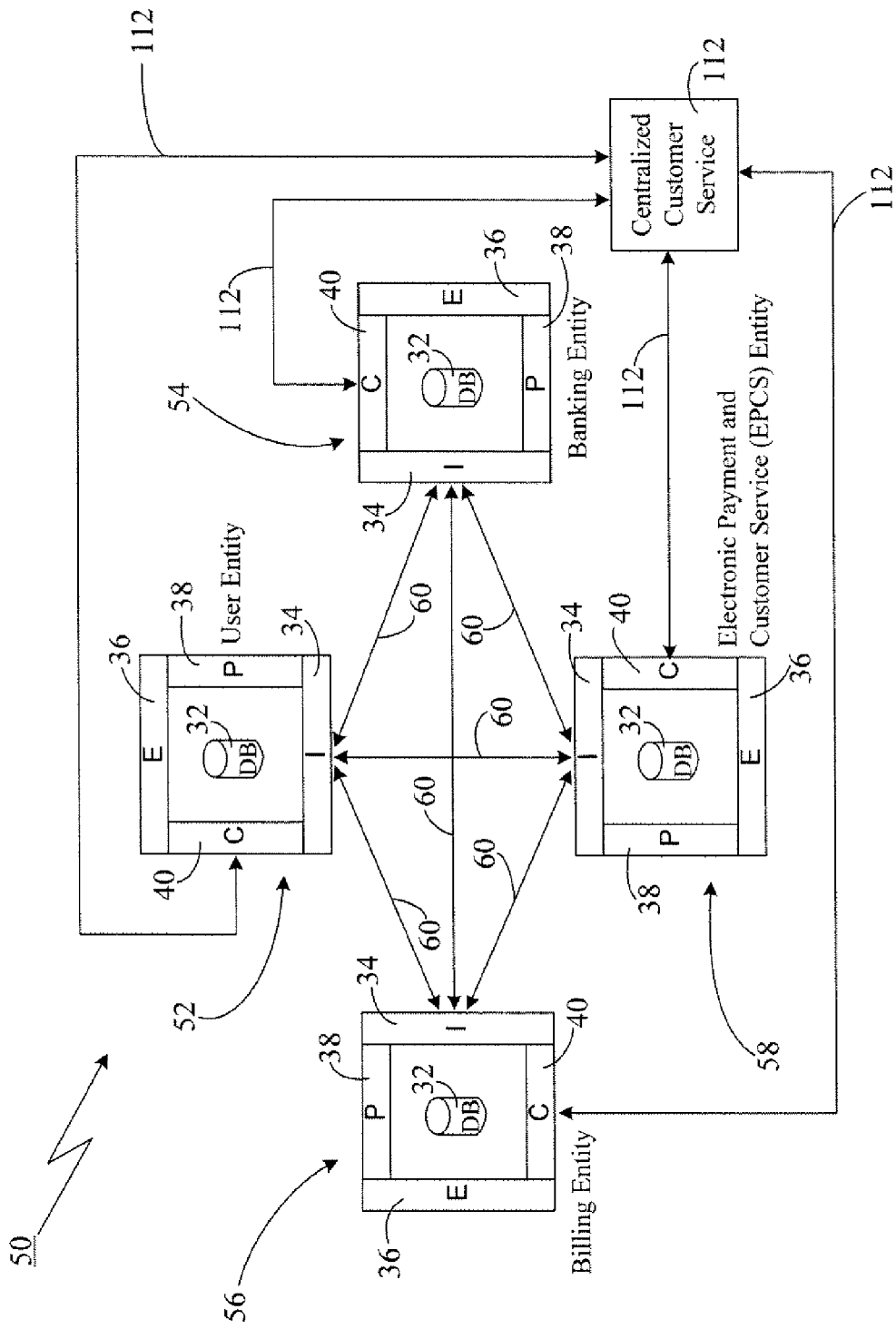
FIG. 9 is a schematic diagram of the electronic bill presentment and payment system shown in FIG. 4, extended to include a centralized customer care entity.

It should be noted that all of the customer care entities described above could be consolidated into a centralized customer service center 110, as shown in FIG. 9. In such a scenario, each of the database entities would process customer care messages to and from the centralized customer service center 110 similar to as described above. The communications between the various database entities and the centralized customer service center 110 would be performed over interconnections 112, which can be electrical wire, optical fiber, or microwave-based interconnections.

Referring to FIGS. 10-15, there are shown flowchart diagrams of data and message flows between the various entities within the system 50. These flowchart diagrams assume that the user entity 52 is an HTML browser client, the banking entity 54 is the primary point of presence for a subscriber to the system 50, the billing entity 56 controls bill presentment, and the EPCS entity 58 controls bill payment.

Figure 10:
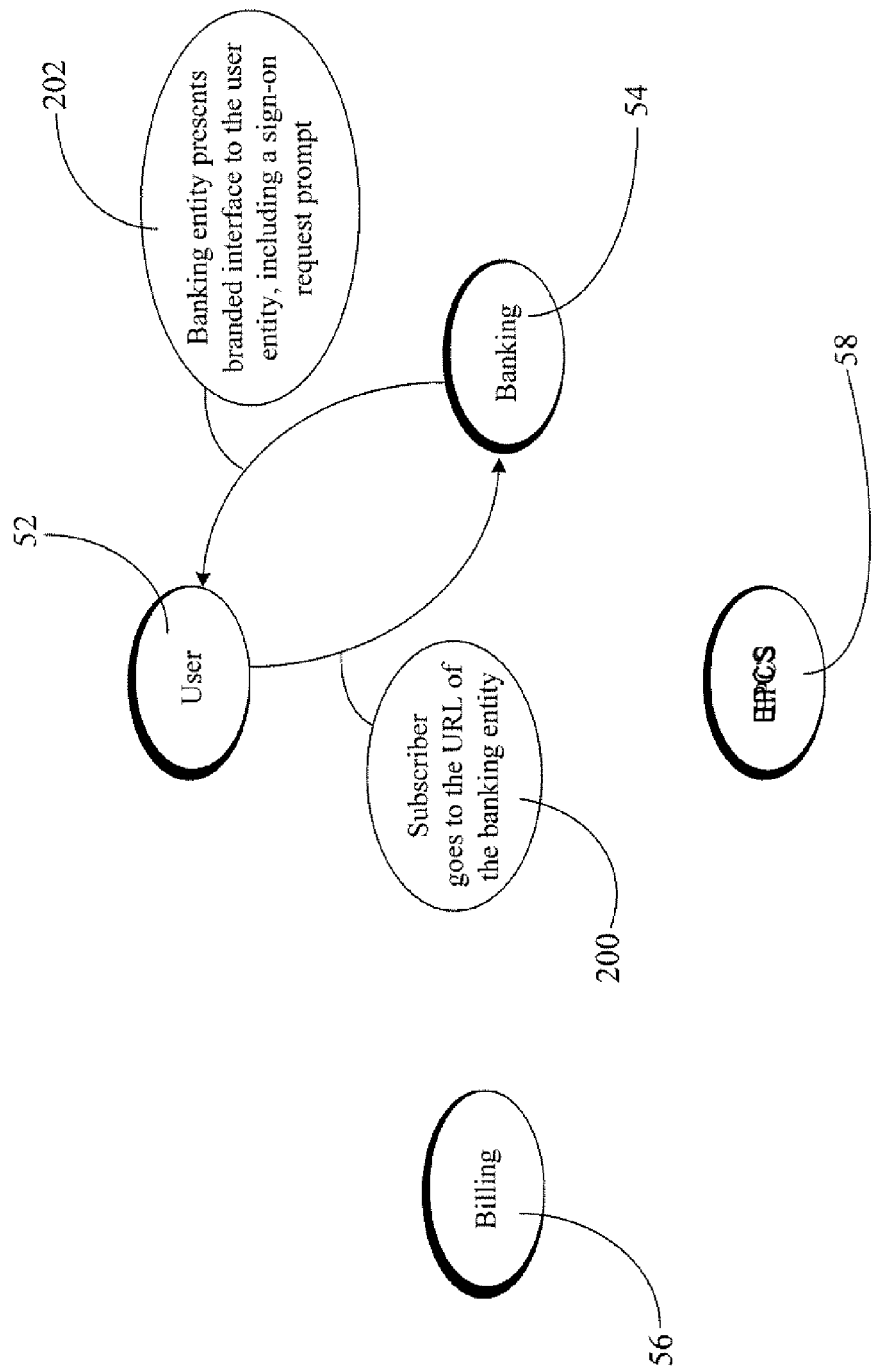
FIG. 10 is a flowchart diagram showing initial sign-on data and message flows between a user entity and a banking entity in the electronic bill presentment and payment system shown in FIG. 4.
Figure 16:
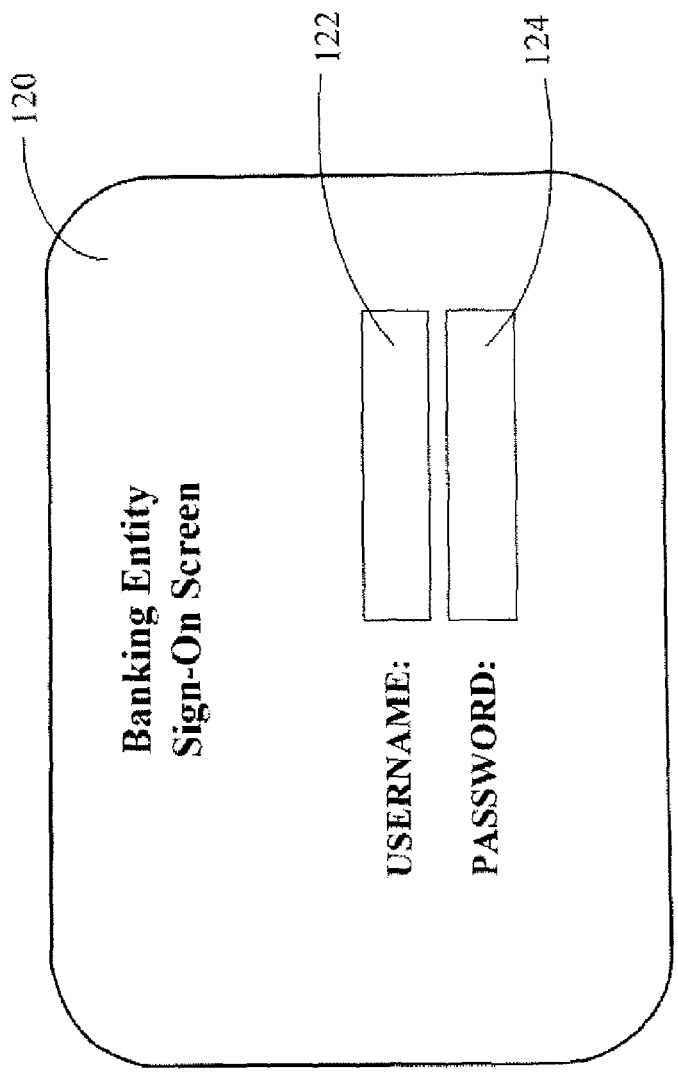
FIG. 16 shows an example of a branded interface having a sign-on request prompt that includes a username field and a password field, in accordance with the present invention.

In FIG. 10, a subscriber at the user entity 52 accesses the web site of the banking entity 54 in step 200. In return, the banking entity 54 presents a branded interface to the user entity 52, including a sign-on request prompt in step 202. FIG. 16 shows an example of such a branded interface 120, wherein the sign-on request prompt includes a username field 122 and a password field 124.

Figure 11:
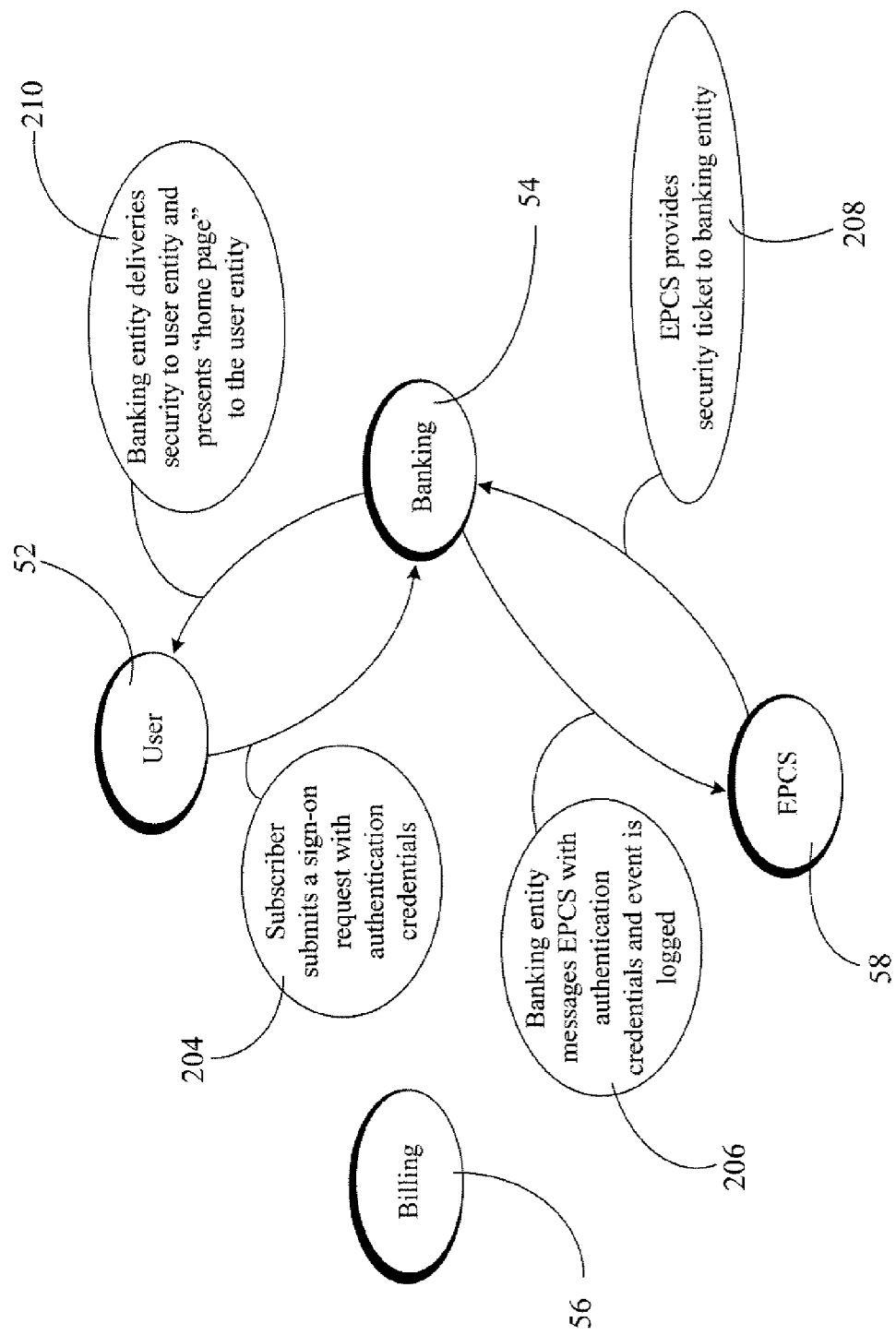
FIG. 11 is a flowchart diagram showing sign-on and authentication data and message flows between a user entity, a banking entity, and an EPCS entity in the electronic bill presentment and payment system shown in FIG. 4.
Figure 17:
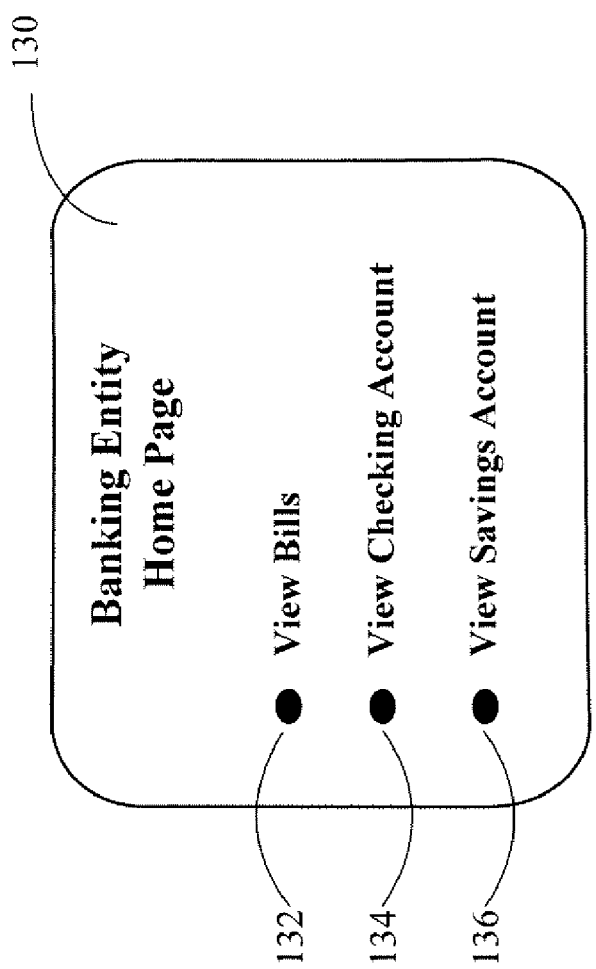
FIG. 17 shows an example of a banking entity home page, including a "view bills" icon, a "view checking account" icon, and a "view savings account" icon, in accordance with the present invention.

In FIG. 11, the user entity 52 submits a sign-on request with authentication credentials in steps 204. The banking entity 54 messages the EPCS entity 58 with the authentication credentials of the subscriber and the event is logged in step 206. The EPCS entity 58 provides a security ticket to the banking entity 54 in step 208. The banking entity 54 delivers the security ticket to the user entity 52 and presents its "home page" to user entity 52 in step 210. FIG. 17 shows an example of such a home page 130, which includes a "view bills" icon 132, a "view checking account" icon 134, and a "view savings account" icon 136.

It should be noted that either the EPCS entity 58 or the banking entity 54 could perform the authentication procedure, but in either case the event is still logged in the event tracking database.

Figure 12:
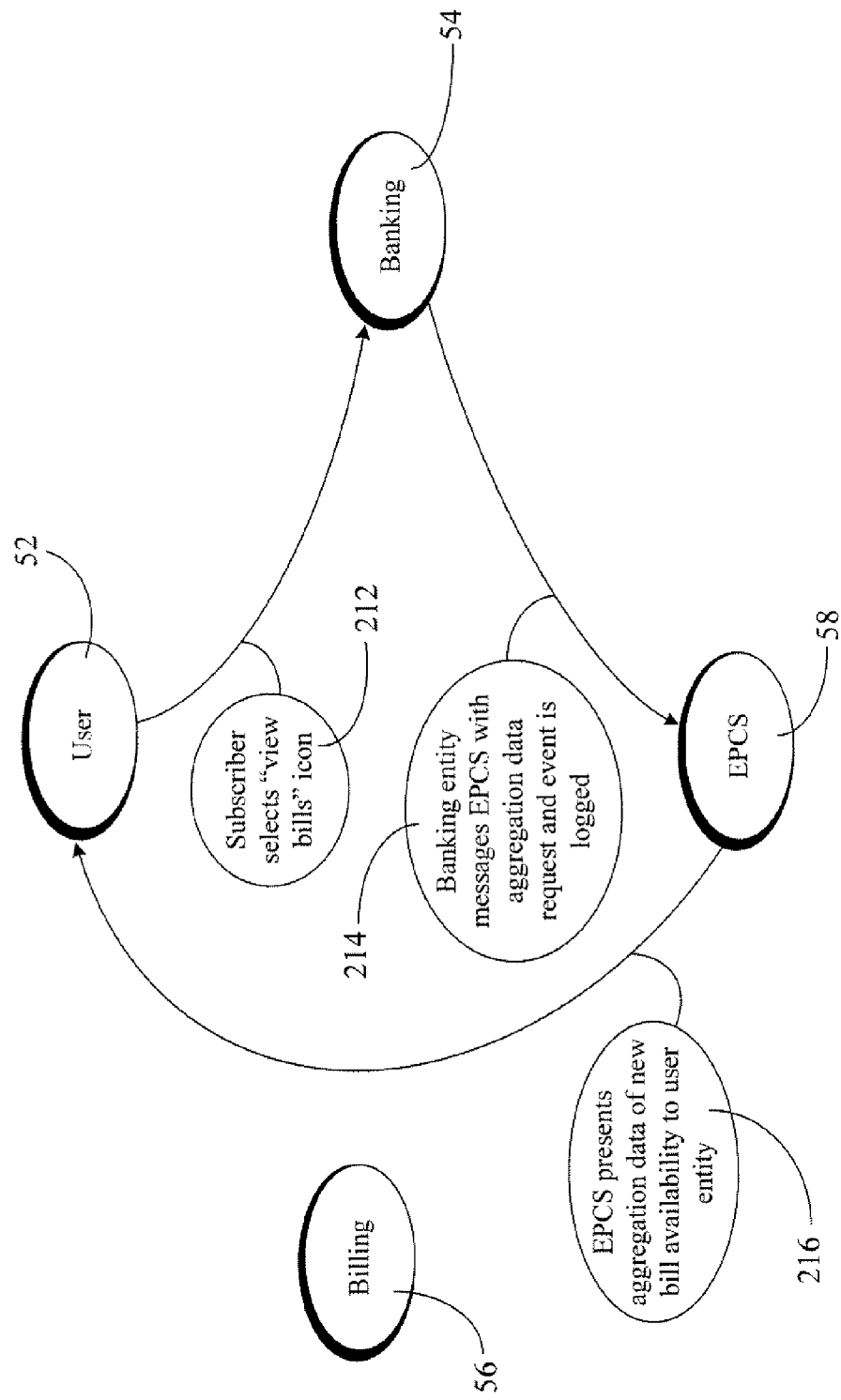
FIG. 12 is a flowchart diagram showing bill availability data and message flows between a user entity, a banking entity, and an EPCS entity in the electronic bill presentment and payment system shown in FIG. 4.
Figure 18:
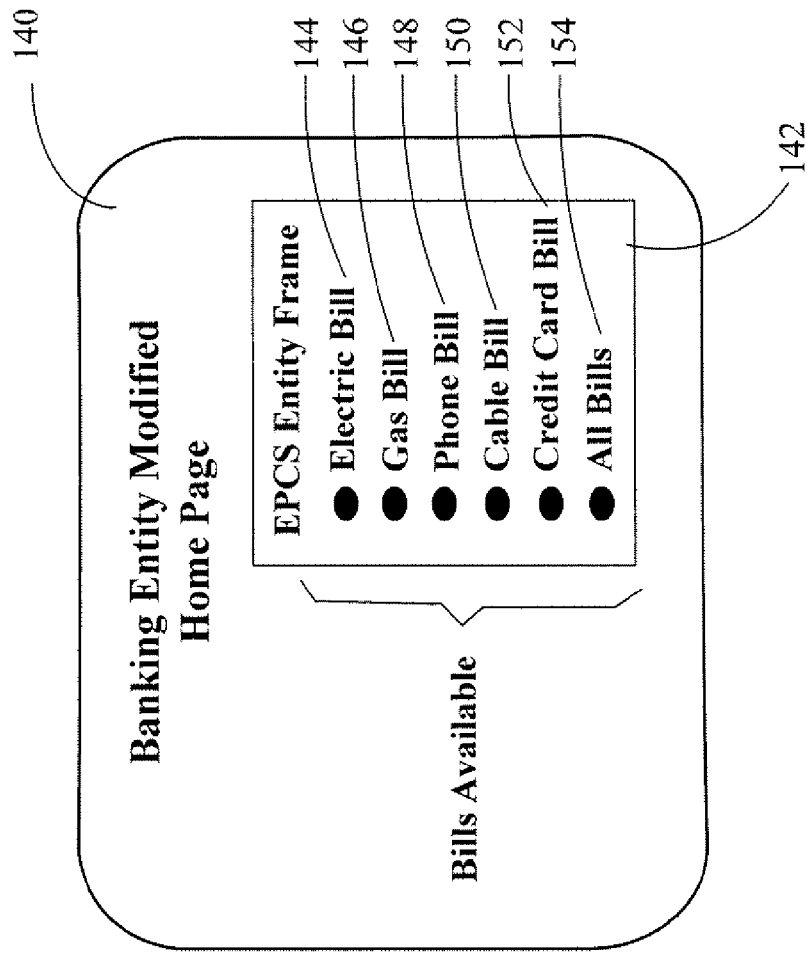
FIG. 18 shows a first modified banking entity home page having a frame presenting new bill availability data, in accordance with the present invention.

In FIG. 12, the subscriber selects the "view bills" icon 132 in step 212. The banking entity 54 messages the EPCS entity 58 with an aggregation data request and the event is logged in step 214. The EPCS entity 58 presents aggregation data of new bill availability to user entity 52 in step 216. FIG. 18 shows a first modified home page 140 having an EPCS entity frame 142 presenting the new bill availability data, which includes an "electric bill" icon 144, a "gas bill" icon 146, a "phone bill" icon 148, a "cable bill" icon 150, a "credit card bill" icon 152, and an "all bills" icon 154 which allows all bills to be presented simultaneously, albeit in separate frames.

Figure 13A:
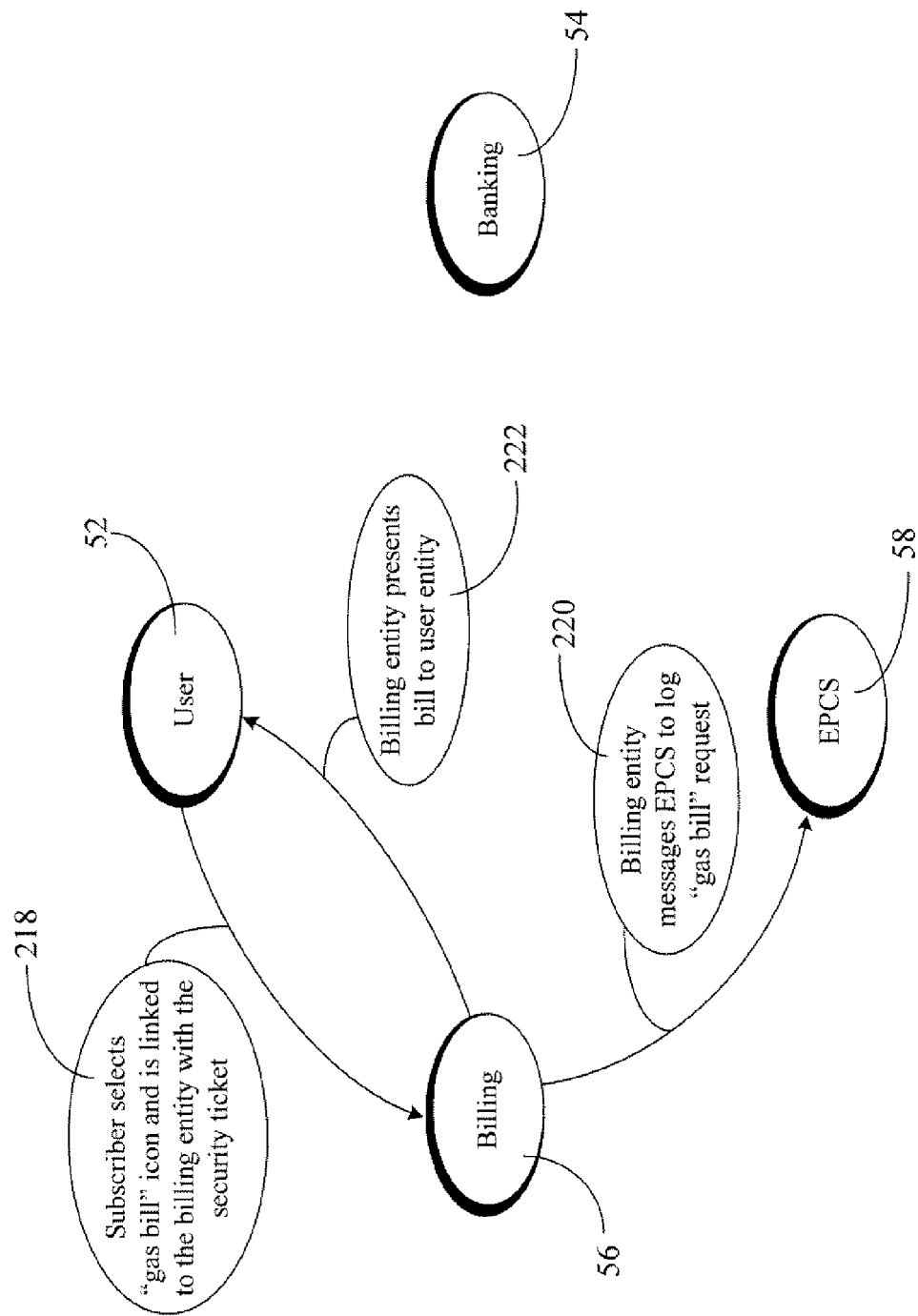
FIG. 13A is a flowchart diagram showing billing entity presentment data and message flows between a user entity, a billing entity, and an EPCS entity in the electronic bill presentment and payment system shown in FIG. 4.
Figure 19:
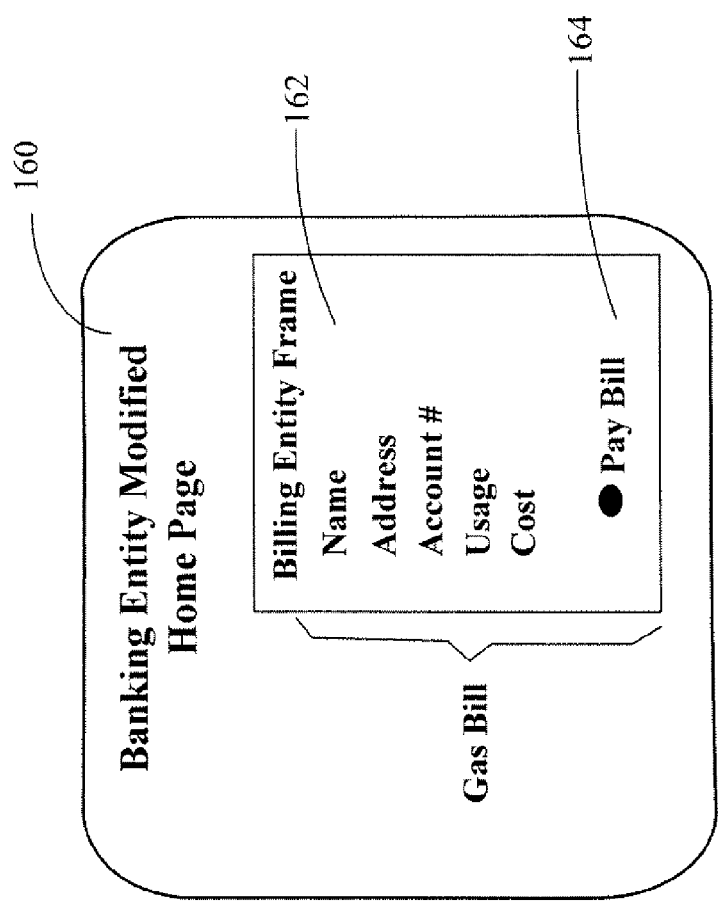
FIG. 19 shows a second modified banking entity home page having a frame presenting detailed bill data, in accordance with the present invention.

In FIG. 13A, the subscriber selects the "gas bill" icon 146 and is linked to the billing entity 56 along with the security ticket in step 218. The billing entity 56 messages the EPCS entity 58 to log the "view bill" request event in step 220. The billing entity 56 presents detailed bill data to the user entity 52 in step 222. FIG. 19 shows a second modified home page 160 having a billing entity frame 162 presenting the detailed bill data, which includes the subscriber name, subscriber address, account number, usage, and cost, and a "pay bill" icon 164.

Figure 14:
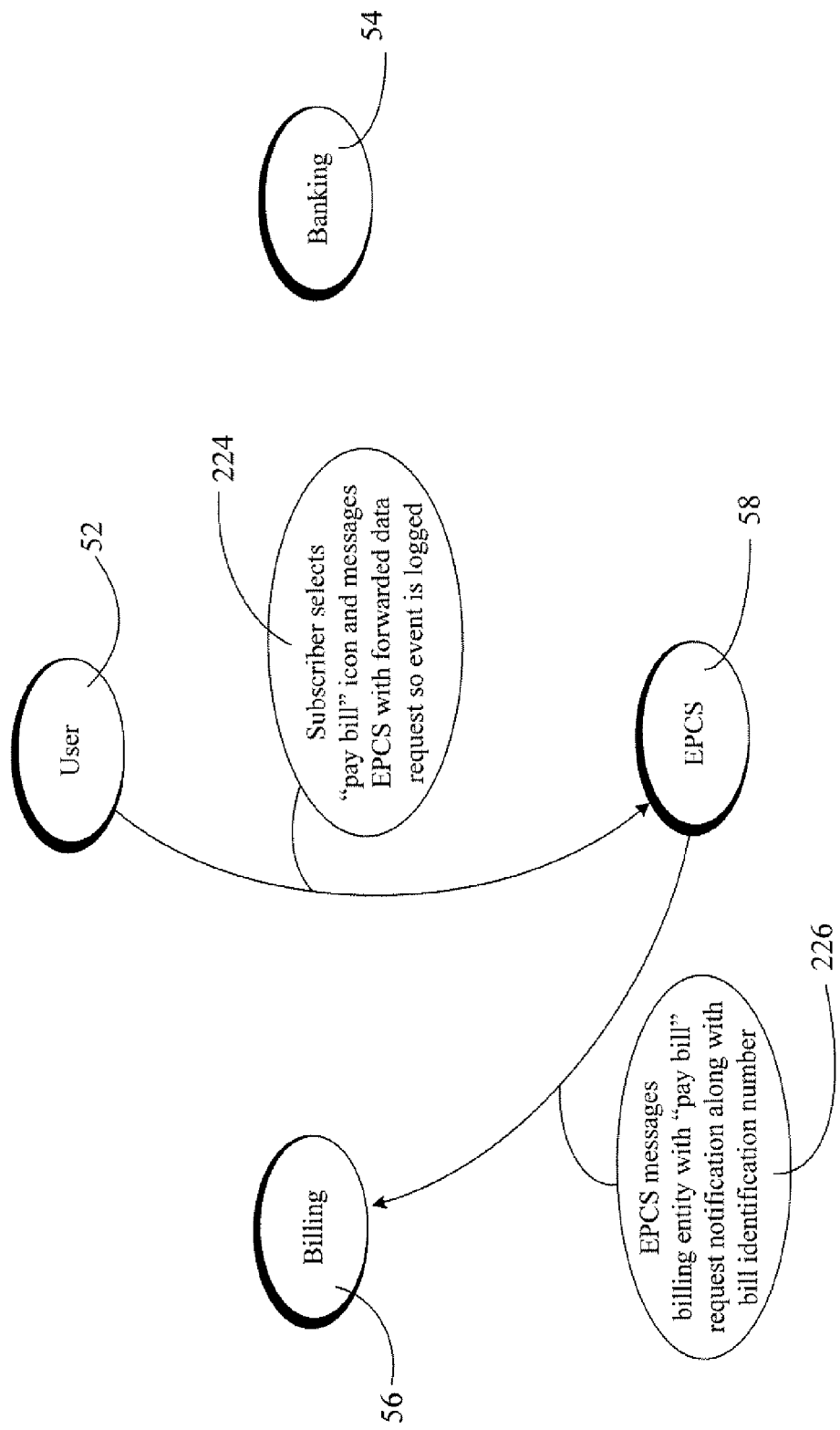
FIG. 14 is a flowchart diagram showing bill payment data and message flows between a user entity, an EPCS entity, and a billing entity in the electronic bill presentment and payment system shown in FIG. 4.

In FIG. 14, the subscriber selects the "pay bill" icon 164 and messages the EPS entity 58 with a forward dated pay bill request so the event is logged in step 224. The EPS entity 58 messages the billing entity 56 with a pay bill request notification along with a bill identification number in step 226.

Figure 15:
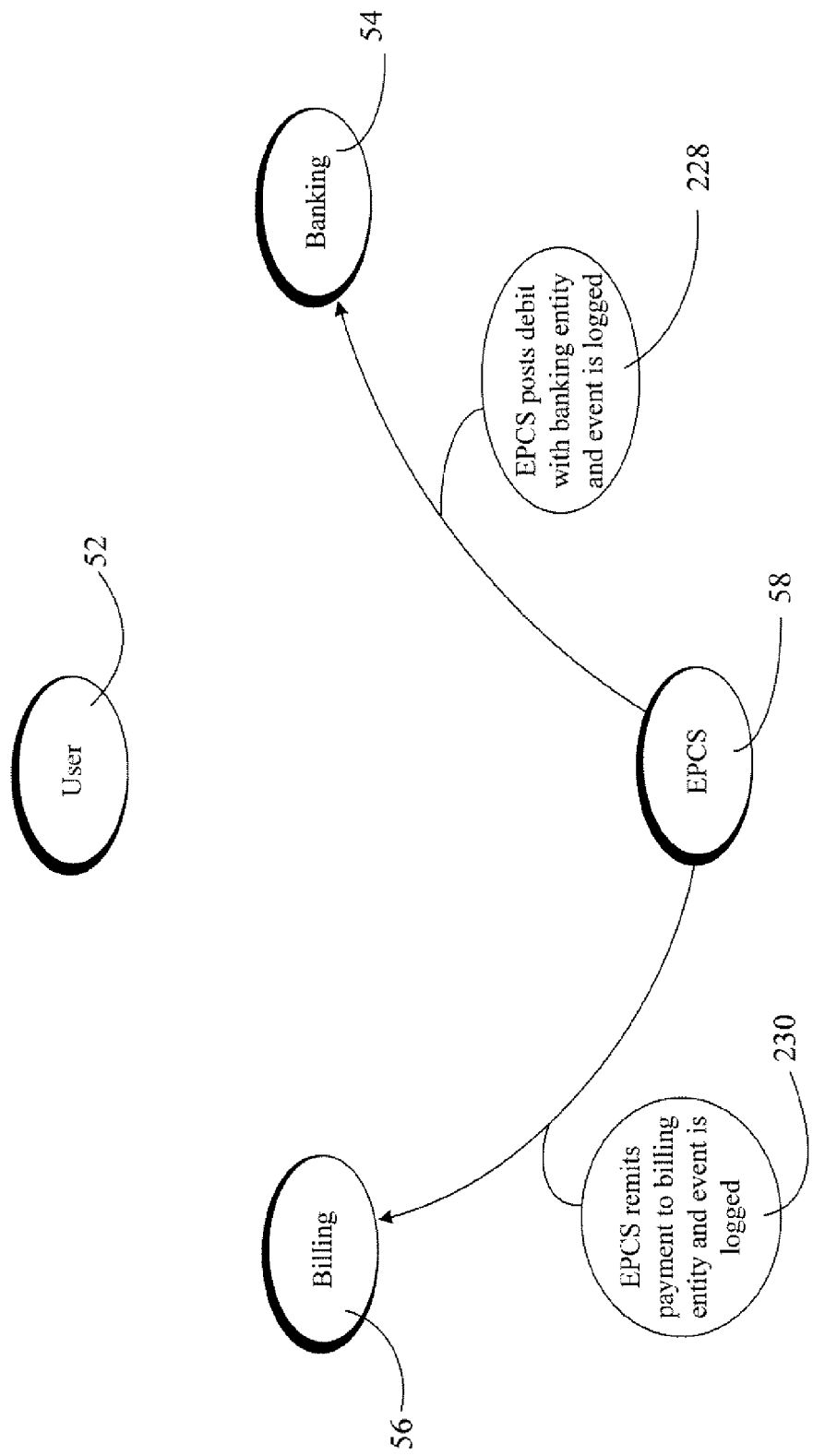
FIG. 15 is a flowchart diagram showing bill remittance and debiting data and message flows between an EPCS entity and a billing entity and a banking entity in the electronic bill presentment and payment system shown in FIG. 4.

In FIG. 15, the EPS posts a debit with the banking entity 54 and the event is logged in step 228. The EPS entity 58 then remits a payment to the billing entity 56 and the event is logged in step 230.

Figure 13B:
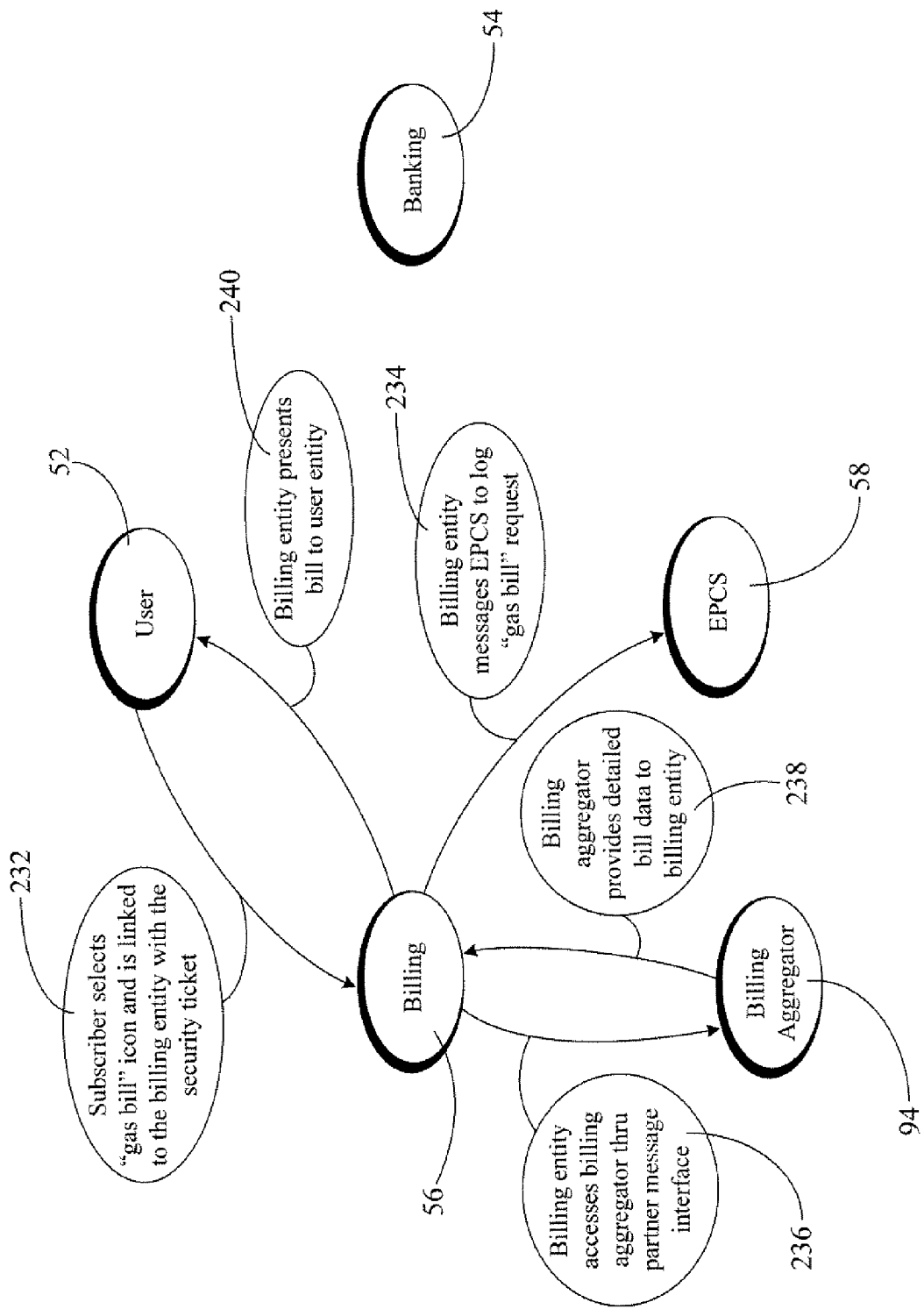
FIG. 13B is a flowchart diagram showing billing aggregator bill presentment data and message flows between a user entity, a billing entity, an EPCS entity, and an established billing aggregator in the electronic bill presentment and payment system shown in FIG. 4.

FIG. 13B can be substituted for FIG. 13A in the above-described sequence of flowchart diagrams to show how detailed bill data can be provided by the established billing aggregator 94 thru the partner message interface 38 of the billing entity 56. In FIG. 13B, the subscriber again selects the "gas bill" icon 146 and is linked to the billing entity 56 along with the security ticket in step 232. The billing entity 56 again messages the EPCS entity 58 to log the "view bill" request event in step 234. However, in this case, detailed bill data is available only from the established billing aggregator 94. Thus, the billing entity 56 accesses the established billing aggregator 94 through its partner message interface 38 in step 236. In response, the established billing aggregator 94 provides detailed bill data to the billing entity 56 in step 238. The billing entity 56 then presents the detailed bill data to the user entity 52 in step 240.

It should be noted that, in an alternative embodiment, the established billing aggregator 94 could present the detailed bill data directly to the user entity 52.

Figure 13C:
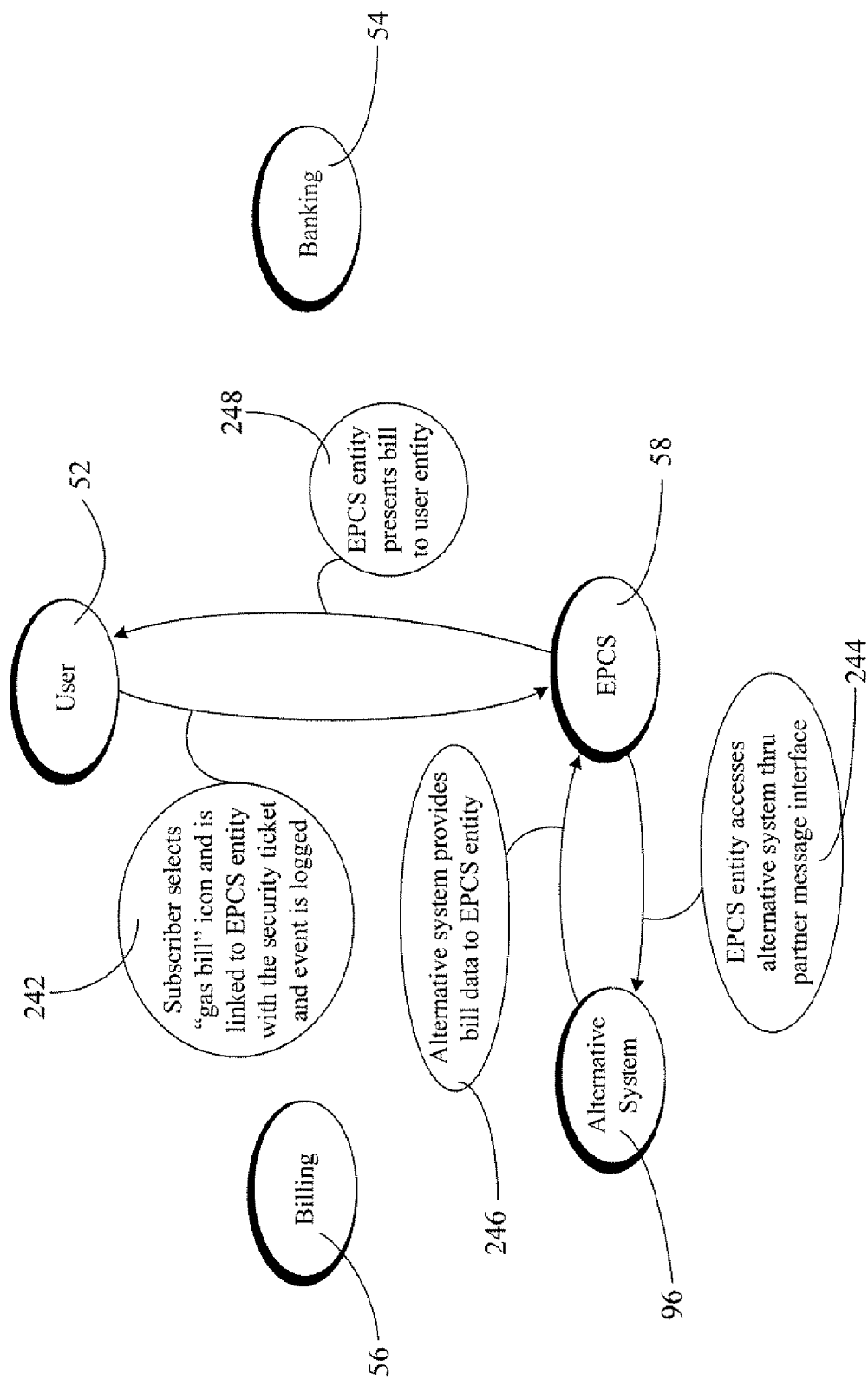
FIG. 13C is a flowchart diagram showing alternative system bill presentment data and message flows between a user entity, an EPCS entity, and an alternative bill presentment and payment system in the electronic bill presentment and payment system shown in FIG. 4.

FIG. 13C can be substituted for FIG. 13A in the above-described sequence of flowchart diagrams to show how detailed bill data can be provided by the alternative bill presentment and payment system 96 thru the partner message interface 38 of the EPCS entity 58. In FIG. 13C, the subscriber selects the "gas bill" icon 146 and is linked back to the EPCS entity 58 along with the security ticket and the event is logged in step 242. In this case, detailed bill data is available only from the alternative bill presentment and payment system 96. Thus, the EPCS entity 58 accesses the alternative bill presentment and payment system 96 through its partner message interface 38 in step 244. In response, the alternative bill presentment and payment system 96 provides detailed bill data to the EPCS entity 58 in step 246. The EPCS entity 58 then presents the detailed bill data to the user entity 52 in step 248.

It should be noted that, as previously described, the EPCS entity 58 will typically require the capabilities of a billing entity 56 in order to present bills to and from the alternative bill presentment and payment system 96. Alternatively, it should be noted that detailed bill data can be provided by the alternative bill presentment and payment system 96 thru the partner message interface 38 of the billing entity 56 in a manner similar to that as described in FIG. 13B.

Figure 20:
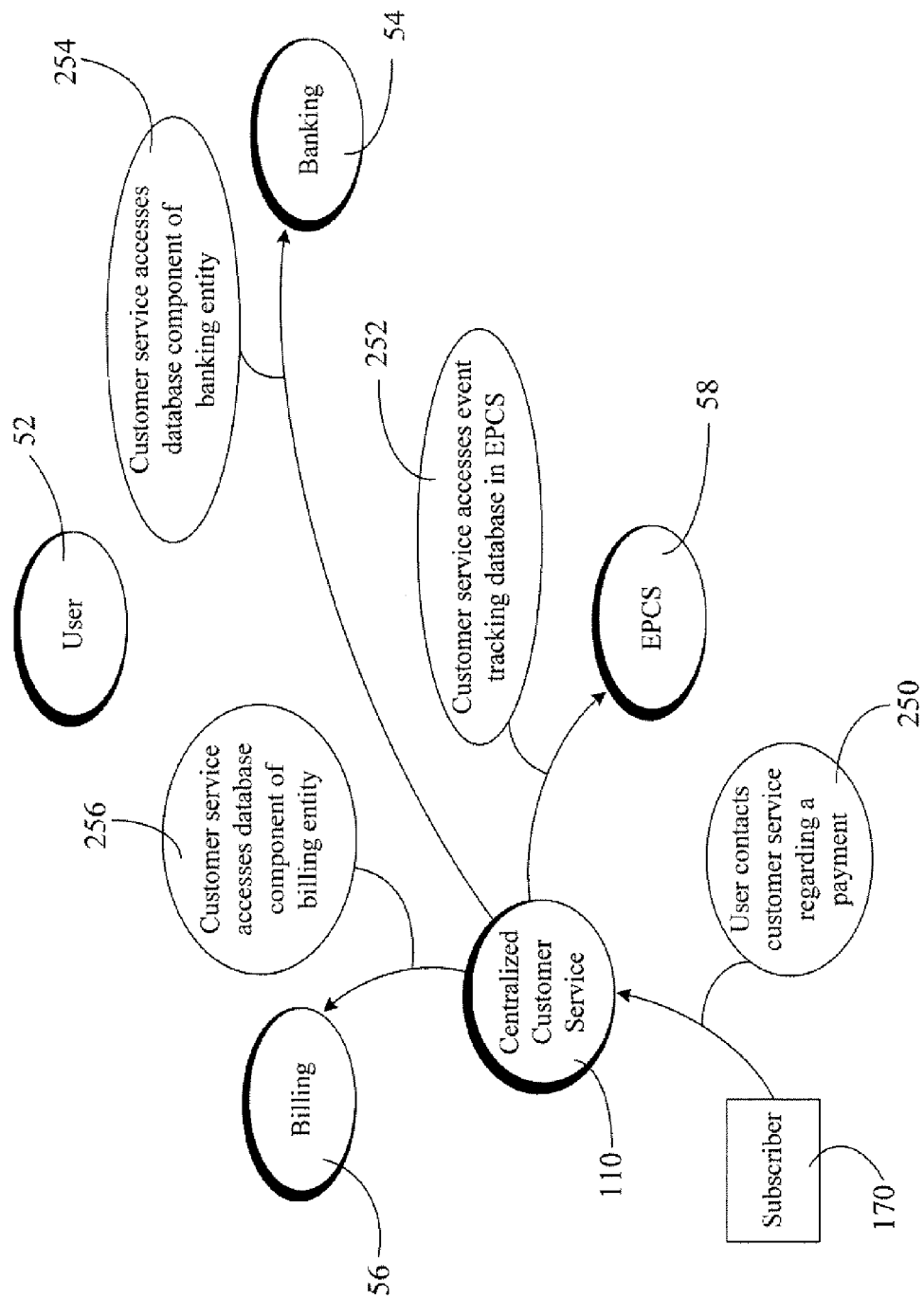
FIG. 20 is a flowchart diagram showing customer service data and message flows between a centralized customer service center, and an EPCS entity, a billing entity, and a banking entity in the electronic bill presentment and payment system shown in FIG. 4.

Referring to FIG. 20, there is shown a flowchart diagram of data and message flows between the centralized customer service center 110 and the various entities within the system 50. A subscriber 170 contacts the centralized customer service center 110 regarding a bill payment in step 250. The centralized customer service center 110 accesses the event tracking database in the EPCS entity 58 to see if a view bill, pay bill, remit payment, or debit posting event has been logged in step 252. If more detailed information regarding, for example, the posting of a debit for a bill, the centralized customer service center 110 can access the database component 32 associated with the banking entity 54, as shown in step 254. Similarly, if more detailed information regarding, for example, the remitting of a payment for a bill, the centralized customer service center 110 can access the database component 32 associated with the billing entity 56, as shown in step 256. It should be noted that, although not shown, the EPCS entity 58 can log all of the above-described accesses performed by centralized customer service center 110.

As is apparent from the foregoing description, the system 50 allows a subscriber to interact directly with individual billers while retaining the benefits of interacting with a single aggregator such as, for example, the ability to retain a single authentication and log-in procedure and a common bill presentation framework. The system 50 also allows a subscriber to retain the benefits of interacting with a single aggregator while allowing the billers and banks to retain certain preferences such as, for example, the ability to retain control of subscriber-related data and a communication channel with each subscriber.

As discussed above with reference to FIGS. 14 and 15, when, after reviewing billing information, detailed or otherwise, at the biller entity site, the user selects "pay bill", the user is directed to the EPCS which communicates with the applicable billing and banking entities to process the payment. To perform this function, the database component 32 associated with the EPCS entity 58 must be kept aware of the total amount of each available bill for a user. Accordingly, each billing entity must provide bill summary information, including at least the total bill amount, for each available bill to the aggregator database, which is preferably but not necessarily located at the EPCS entity, as has been previously discussed. Thus, the database component 32 of the EPCS entity 58 stores bill summary information for each available bill for each user which is accessed and used by the EPCS to process payment responsive to the receipt of the user's "pay bill" request message.

As will be understood, if the total bill amount stored in the database component 32 of the EPCS entity 58 does not match the total bill amount presented to the user by the billing entity, serious payment problems could arise. For example, if in reviewing the detailed electronic bill information maintained by the billing entity, the user is allowed to dispute a charge and to have the disputed charge removed from the bill pending resolution of the dispute, the bill may be adjusted by the billing entity while the user remains on-line. If this adjustment to the total bill amount is not conveyed to the EPCS in real time, should the user select "pay bill" during the session, the total bill amount, as reflected at the billing entity, will be less than the total bill amount stored in the database component 32 of the EPCS entity 58. Thus, the EPCS would process the requested payment in the wrong amount.

Further, some billers, particularly utility companies, are now offering discounts to customers who perform, and provide to the company, monthly meter readings. The utility company generates the customer's bill based upon the meter reading provided by the customer. Receiving this information via a digital communication, such as an Internet communication, facilitates the processing of the information by the company while the user remains on-line. Hence, the user can provide a meter reading, the billing entity can generate a bill based upon the meter reading, and the detailed bill information can be presented to the user all in a single on-line session between the user and the billing entity. If this generated total bill amount is not conveyed to the EPCS in real time, the user either would not be allowed to direct payment of the bill by selecting "pay bill" during the on-line session, or would have the processing of its payment directive delayed, since the EPCS would not be privy to the total bill amount generated by the billing entity at the time of the payment request.

Figure 21:
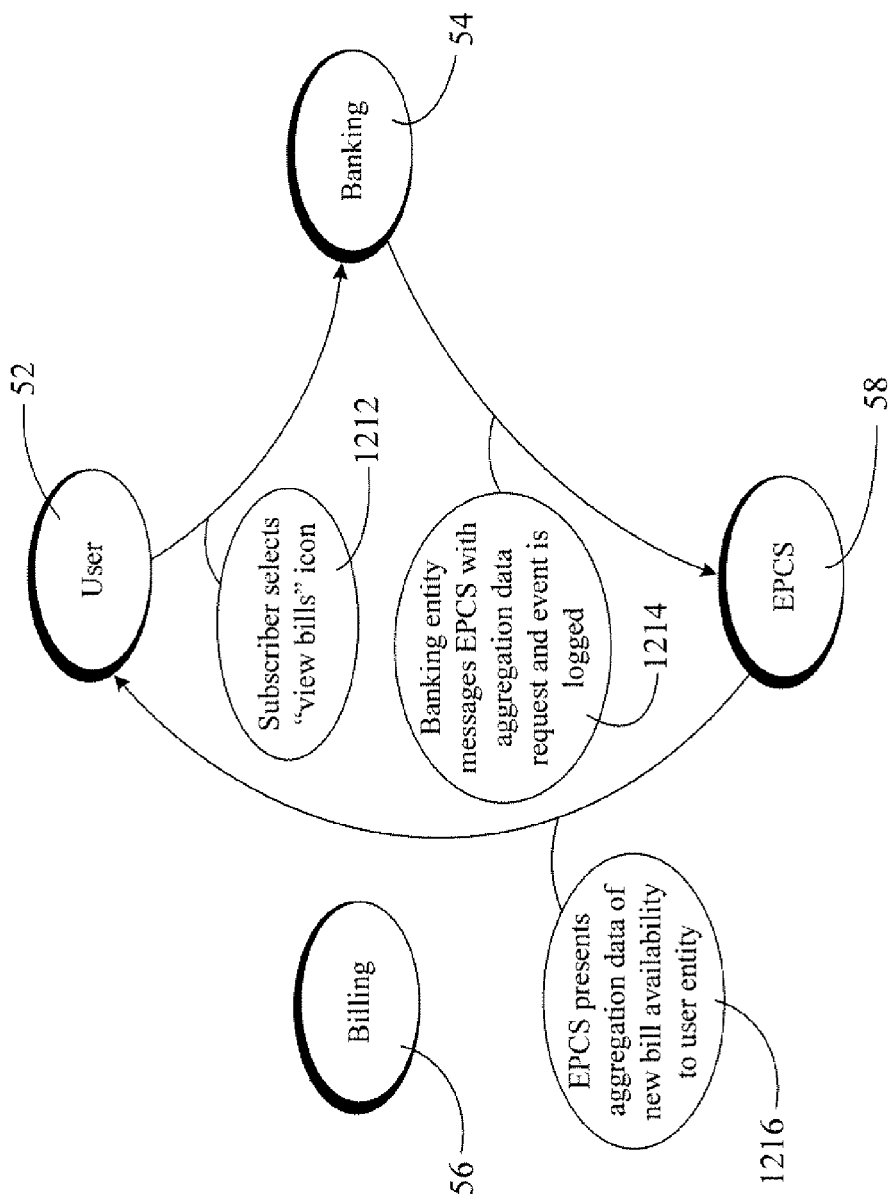
FIG. 21 is a flowchart diagram showing bill availability data and message flows between a user entity, a banking entity, and an EPCS entity in the electronic bill presentment and payment system shown in FIG. 4, modified to allow dynamic updating of bill summary information at the EPCS entity, in accordance with the present invention.

FIG. 21 depicts the message flow in an alternative electronic billing system which is capable of updating bill summary information stored at the EPCS in real time, and hence providing dynamically updateable electronic bill summary information to a subscriber. The system ensures consistency between bill information at the EPCS and at the biller. This feature can be particularly important in facilitating the electronic presentment and payment of bills.

As shown, the subscriber selects the "view bills" icon 1132 in step 1212. The banking entity 54 messages the EPCS entity 58 with an aggregation data request and the event is logged in step 1214. The EPCS entity 58 presents aggregation data of new bill availability to user entity 52 in step 1216.

Figure 22A:
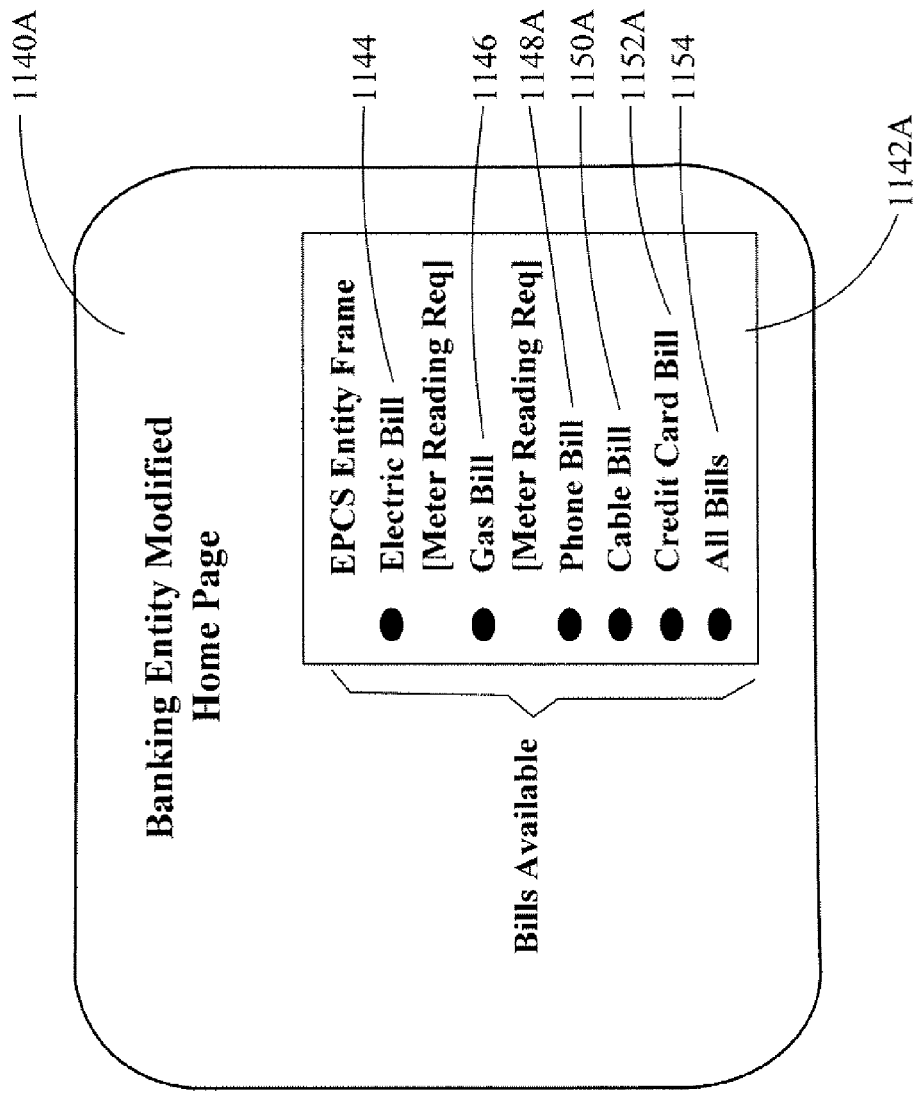
FIG. 22A shows a modified banking entity home page having a frame presenting new bill availability data for a subscriber, with certain data available from the biller only after a meter reading is furnished by the subscriber in accordance with the present invention.

An EPCS entity frame 1140A presenting the new bill availability data for a subscriber is shown in FIG. 22A. FIG. 22A is similar to FIG. 18, except that a notification is provided to the user that the electric and gas bills require a meter reading. More particularly, the available bills shown on screen 1140A include an "electric bill" icon 1144, a "gas bill" icon 1146, a "phone bill" icon 1148A, a "cable bill" icon 1150A, a "credit card bill" icon 1152A, and an "all bills" icon 1154 which allows all bills to be presented simultaneously, albeit in separate frames. The electric and gas bills are shown with an associated notation reminding the subscriber that he/she must provide the applicable meter reading in order to obtain these bills from the biller 56.

Figure 22B:
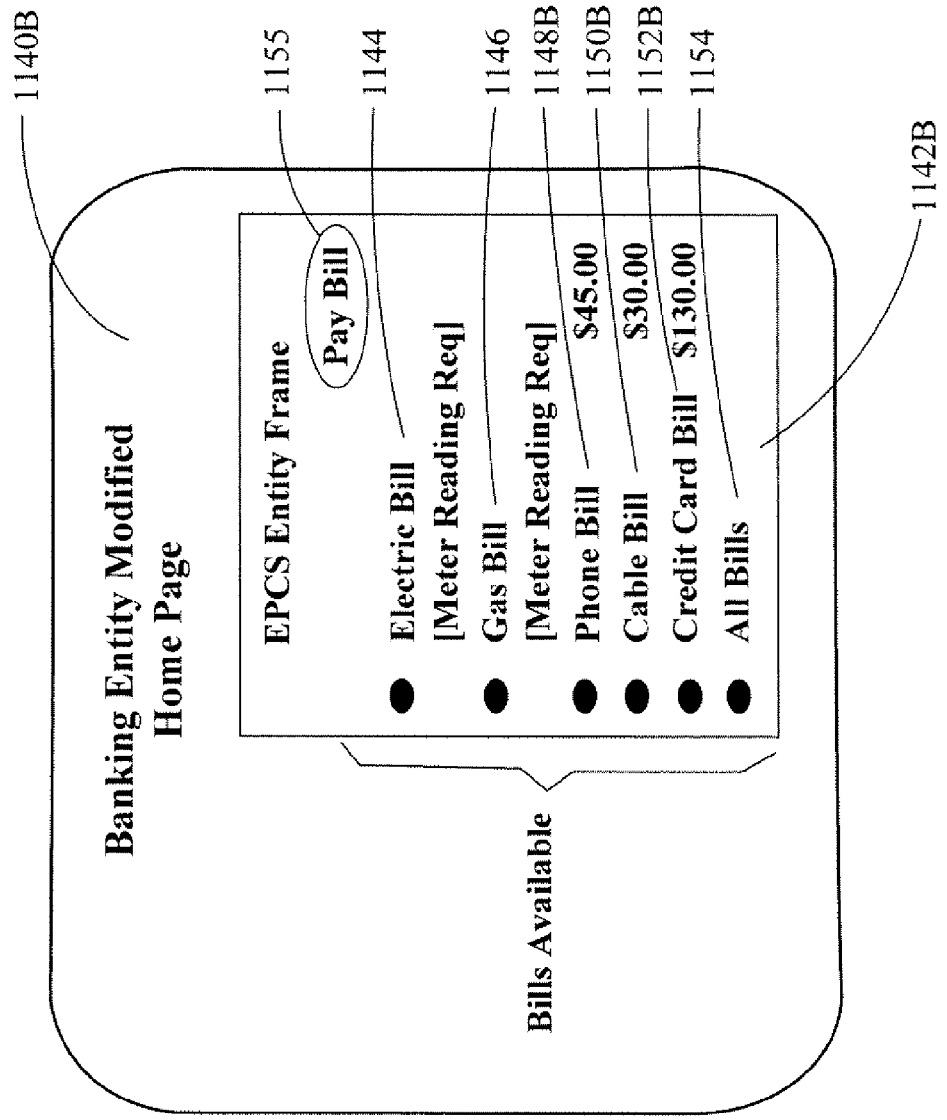
FIG. 22B shows another modified banking entity home page having a frame presenting new bill availability data, including total bill amounts, for a subscriber, with certain data available from the biller only after a meter reading is furnished by the subscriber in accordance with the present invention.

Alternatively, an EPCS entity frame 1140B could be used to present the new bill availability data for a subscriber as shown in FIG. 22B. FIG. 22B is similar to FIG. 22A except that summary information, including the total bill amount, is provided for some of the available bills. More particularly, the available bills shown with the total bill amount on screen 1140B include a "phone bill" icon 1148B, a "cable bill" icon 1150B, and a "credit card bill" icon 1152B. Each of these bills also has a "pay bill" icon 1155, which allows the user to pay that bill directly from the screen 1140B by simply clicking-on the icon for the bill.

Figure 23A:
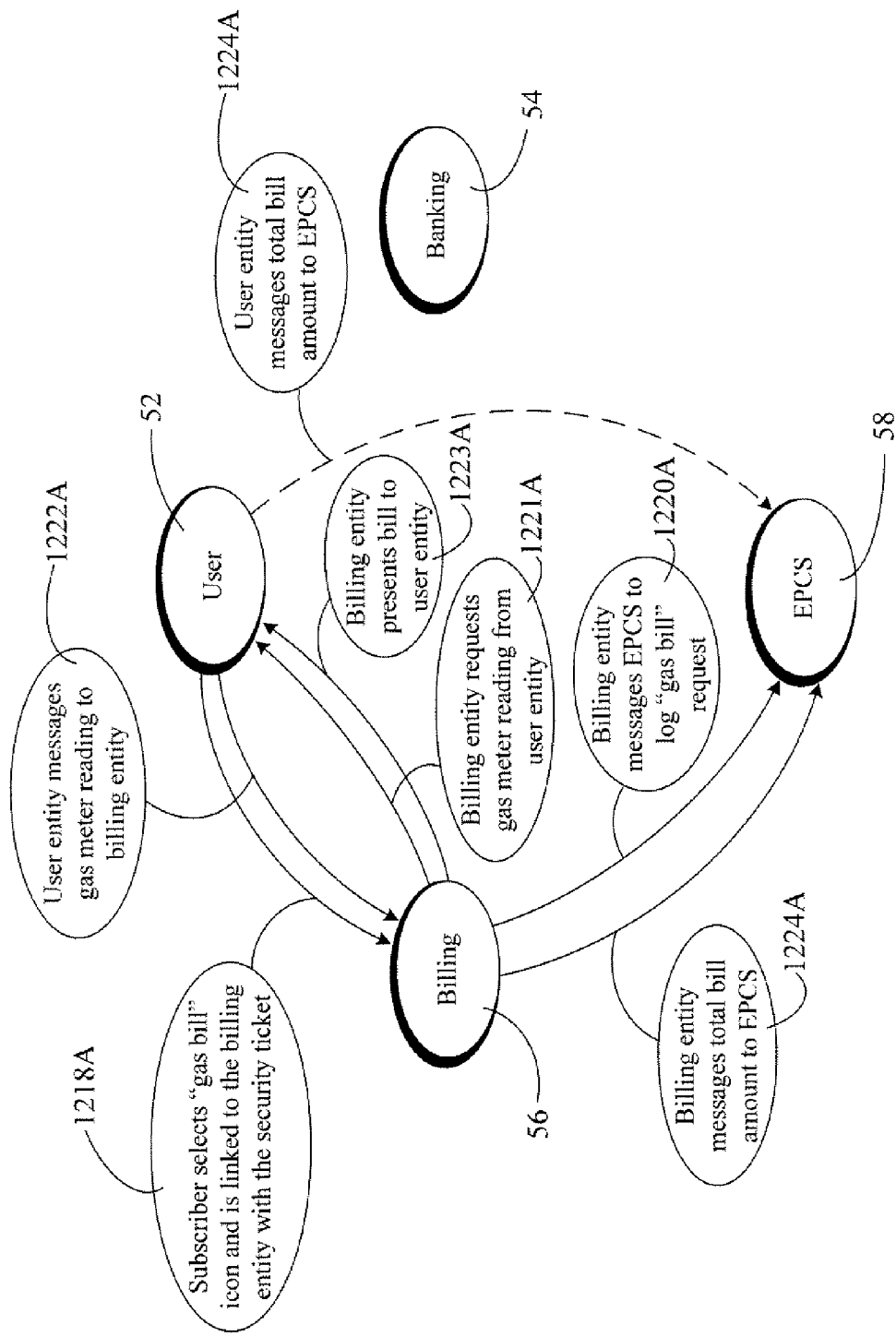
FIG. 23A is a flowchart diagram showing billing entity presentment data after receipt of a meter reading from the subscriber and message flows between a user entity, a billing entity and an EPCS entity in the electronic bill presentment and payment system shown in FIG. 4 for a subscriber, with bill summary information being dynamically updated at the EPCS, in accordance with the present invention.

In FIG. 23A, which is similar to FIG. 13A, the subscriber selects the "gas bill" icon 1146 from screen 1140A or 1140B and is linked to the billing entity 56 along with the security ticket in step 1218A. The billing entity 56 messages the EPCS entity 58 to log the "view bill" request event in step 1220A. The billing entity 56 first presents a query requesting the gas meter reading from the user entity 52 in step 1221A. The user entity 52 responds to the request in step 1222A by messaging the gas meter reading to the billing entity 56. The billing entity 56 processes the gas meter reading to generate the detailed bill data in real time while the user entity remains on-line.

Figure 24A:
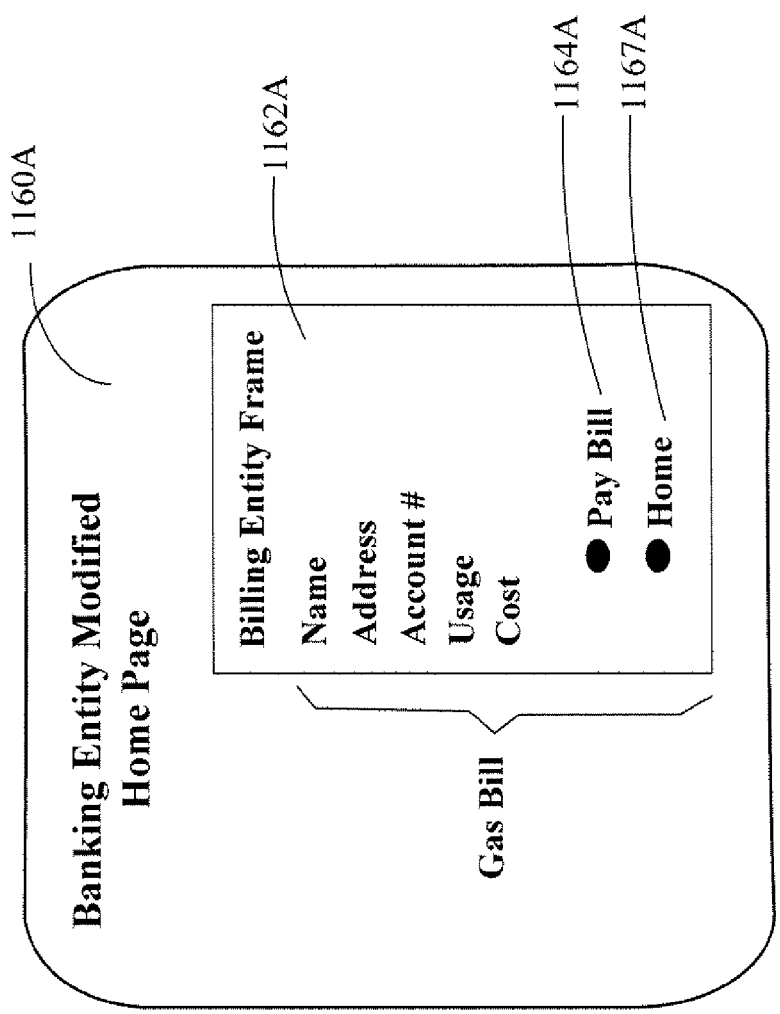
FIG. 24A shows another modified banking entity home page having a billing entity frame presenting detailed bill data to a first subscriber after the subscriber has provided a meter reading, in accordance with the present invention.

The generated detailed bill data is presented to the user entity 52 in step 1223A. As shown in FIG. 24A, the generated detailed bill information is presented on a home page 1160A, having a billing entity frame 1162A which includes the generated detailed gas bill data for the subscriber. The home page 1160A includes, within frame 1162A, the subscriber name, subscriber address, account number, the total cost or amount of the bill, a "pay bill" icon 1164A and a "home" icon 1167A.

In one alternative operational sequence, the billing entity 56 messages the total amount of the generated gas bill to the EPCS 58 in real time while the user entity 52 remains on-line in step 1224A. The detailed gas bill data is stored in the database component 32 of the billing entity 56. The total gas bill amount is stored in the database component 32 of the EPCS 58. Hence, the subscriber can now click on the "pay bill" icon 1164A to be hyperlinked back and to transmit a pay request message to the EPCS 58. The EPCS will have the generated bill amount necessary to proceed with the payment, as has been previously described, in accordance with the pay instruction. The subscriber can alternatively click on the "home" icon 1167A to reconnect to the EPCS 58 and again view screen 1140A or 1140B. In this viewing the screen 1140A or the screen 1140B, as applicable, would be modified so as to reflect the total gas bill amount due.

More particularly, the modified screen 1140A no longer includes the indication shown in FIG. 22A that a gas meter reading is required. Rather, the EPCS 58, responsive to the receipt of the total bill amount and in real time, generates a revised screen 1140A for presentation to the subscriber which reflects the total gas bill amount computed by the billing entity 56 based on the gas meter reading provided by the user entity 52. The modified screen 1140B also eliminates the indication shown in FIG. 22B that a gas meter reading is required and displays the computed total gas bill amount and an associated "pay bill" icon.

In a preferred alternative operational sequence, user entity 52 rather than billing entity 56 messages the computed total gas bill amount to the EPCS 58. More particularly, after being presented with the generated bill, the subscriber clicks on either the "pay bill" icon 1164A or the "home" icon 1167A and is hyperlinked back to the EPCS 58. A fat URL is used to address the EPCS 58, allowing the generated total bill amount to be included in the URL used to hyperlink back to the EPCS. Thus, the EPCS 58 receives the generated bill amount from the subscriber, either with or without an instruction to pay the bill, in real time while the user entity 52 remains on-line in step 1224A'. Here again, the detailed gas bill data is stored in the database component 32 of the billing entity 56 and the total gas bill amount is stored, at least temporarily, in the database component 32 of the EPCS 58.

If the subscriber has clicked on the "home" icon 1167A, the subscriber can again view screen 1140A or 1140B. In this viewing the screen 1140A would be modified to eliminate the indication shown in FIG. 22A that a gas meter reading is required. As previously discussed, the EPCS responds to the receipt of the total bill amount by generating, in real time, a revised screen 1140A for presentation to the subscriber which reflects the biller computed total bill amount based on the user provided gas meter reading. The screen 1140B is modified to eliminate the indication that a gas meter reading is required, as shown in FIG. 22B, and also to display the total gas bill amount and an associated "pay bill" icon.

Figure 23B:
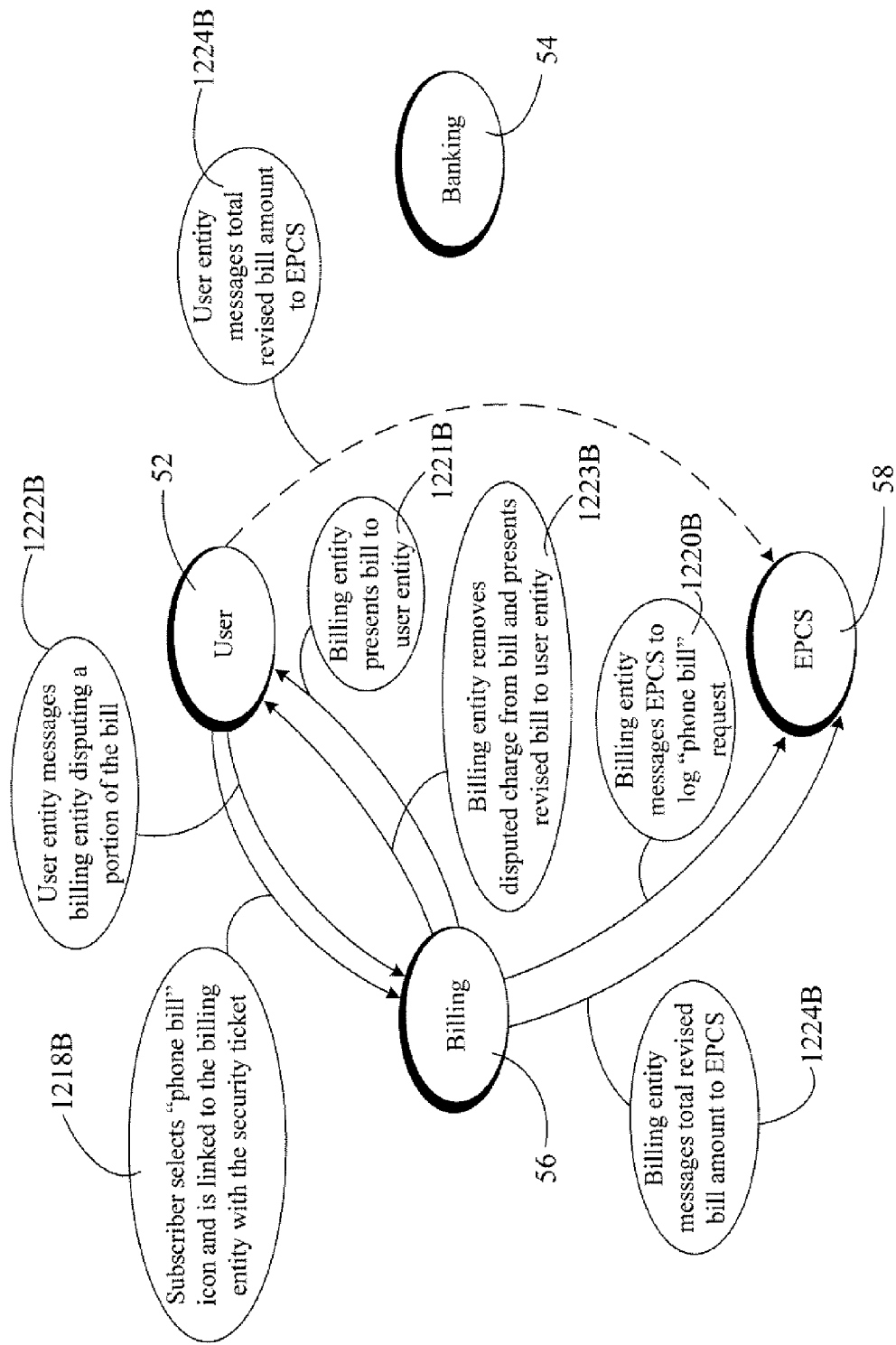
FIG. 23B is a flowchart diagram showing billing entity presentment data after receipt of a message indicating a portion of an originally presented bill is disputed by the subscriber and message flows between a user entity, a billing entity and an EPCS entity in the electronic bill presentment and payment system shown in FIG. 4 for a subscriber, with bill summary information being dynamically updated at the EPCS, in accordance with the present invention.

In FIG. 23B, the subscriber selects the "phone bill" icon 1140A or 1140B to view the phone bill and is linked to the billing entity 56 along with the security ticket in step 1218B. The billing entity 56 messages the EPCS entity 58 to log the "view bill" request event in step 1220B. The billing entity 56 presents the detailed bill data, which is stored in the database component 32 of the billing entity 56, to the user entity 52 in step 1221B.

Figure 24B:
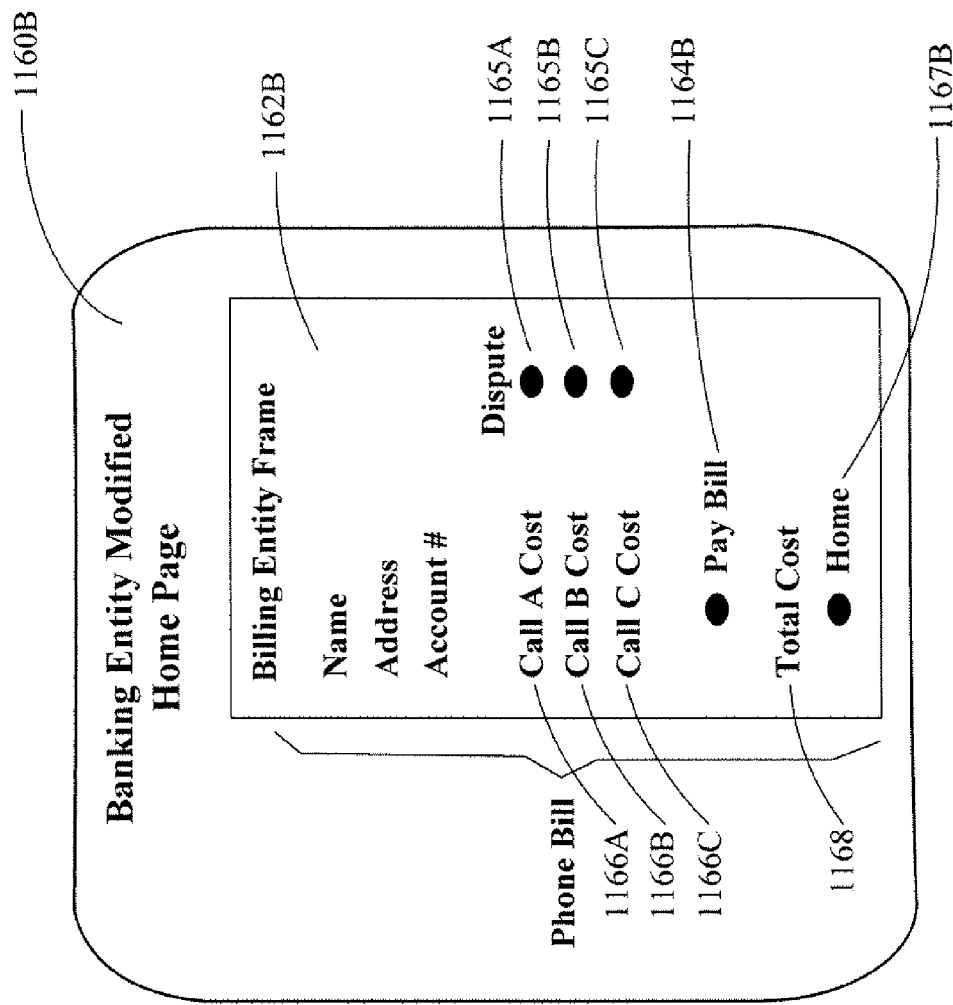
FIG. 24B shows another modified banking entity home page having a billing entity frame presenting detailed bill data which can be revised to reflect disputed portions of the bill, in accordance with the present invention.

Turning to FIG. 24B, a home page 1160B has a billing entity frame 1162B presenting the detailed phone bill data to the subscriber. The home page 1160B includes, within frame 1162B, the subscriber name, subscriber address, account number, a breakout of the individual calls being charged 1166A, 1166B and 1166C, and the associated cost of each call, the total bill amount 1168, a "pay bill" icon 1164B, a "home" icon 1167B and respective "dispute" icons 1165A, 1165B and 1165C.

The subscriber responds to the detailed phone bill data presented in step 1221B by clicking on the dispute icon 1165B. This results in the user entity 52 messaging the billing entity 56 in step 1222B with an indication that the charge for call 1166B is disputed by the subscriber. The billing entity 56 processes the dispute message to remove the disputed charge and to generate revised detailed bill data in real time while the user entity remains on-line.

Figure 24C:
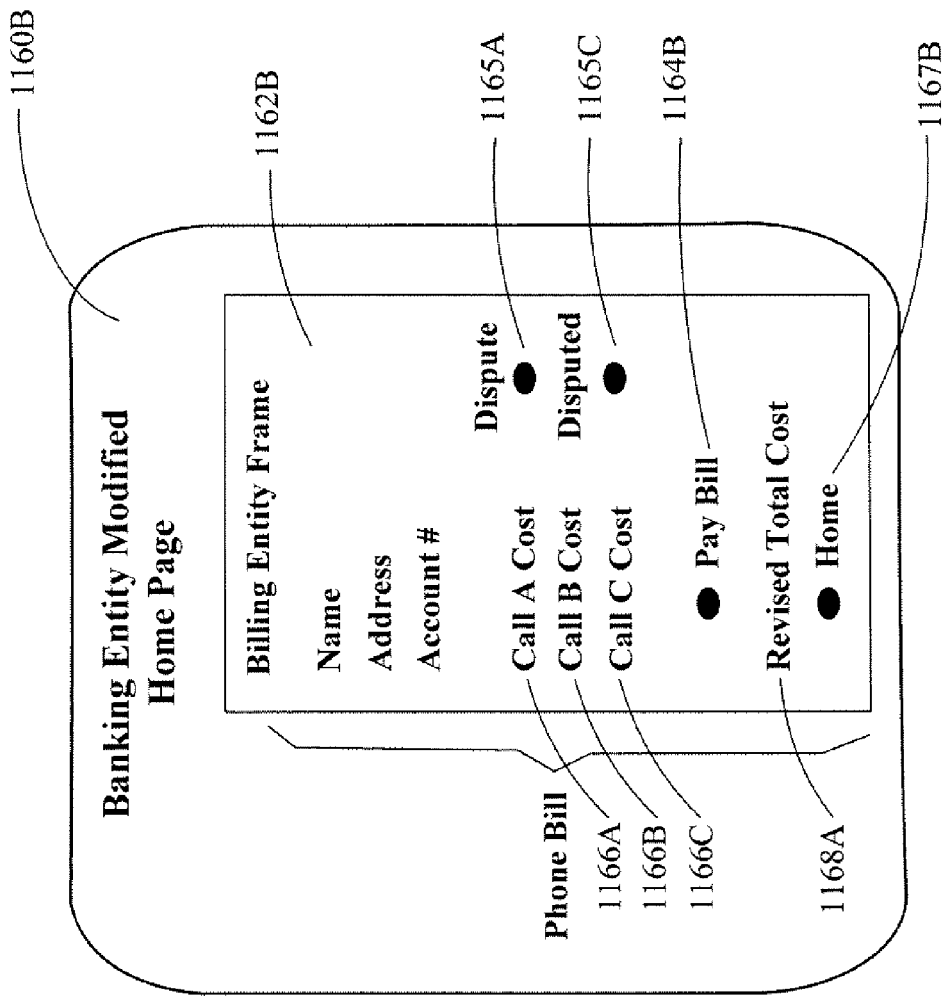
FIG. 24C shows the modified banking entity home page of FIG. 24B having a billing entity frame presenting modified detailed bill data indicating that a portion of the bill is disputed, in accordance with the present invention.

The generated revised detailed bill data is presented to the user entity 52 in step 1223B. As shown in FIG. 24C, the home page 1160B has the billing entity frame 1162B updated to present the detailed revised phone bill data to the subscriber. The home page 1160B therefore now includes, within revised frame 1162B, the breakout of the individual calls being charged, i.e. calls 1166A and 1166C, with their associated cost, and the revised total amount 1168A based on only these calls. The revised frame 1162B also reflects that the cost of call 1166B is disputed.

In one alternative operational sequence, the billing entity 56 messages the revised total amount of the phone bill to the EPCS 58 in real time, while the user entity 52 remains on-line, in step 1224B. The revised detailed phone bill data is stored in the database component 32 of the billing entity 56. The revised total phone bill amount is stored in the database component 32 of the EPCS 58. Hence, the subscriber can now click on the "pay bill" icon 1164B to be hyperlinked back and to transmit a pay request message to the EPCS 58. The EPCS has the generated revised bill amount necessary to proceed with the payment in accordance with the instruction, as has been previously described. The subscriber can alternatively click on the "home" icon 1167B to reconnect to the EPCS 58 and again view screen 1140A or 1140B, as applicable. In this viewing the screen 1140A would remain as shown in FIG. 22A but the screen 1140B would be modified.

More particularly, the modified screen 1140B displays the revised total phone bill amount. This is accomplished by the EPCS 58, responsive to the receipt of the revised total bill amount and in real time, generating revised screen 1140B for presentation to the subscriber so as to reflect the computed revised total gas bill amount.

In a preferred alternative operational sequence, user entity 52 rather than billing entity 56 messages the computed revised total phone bill amount to the EPCS 58. More particularly, after being presented with the generated revised bill, the subscriber clicks on either the "pay bill" icon 1164B or the "home" icon 1167B and is hyperlinked back to the EPCS 58. As discussed above, a fat URL is used to address the EPCS 58. This allows the generated revised total bill amount to be included in the URL used to hyperlink back to the EPCS. Thus, the EPCS 58 receives the generated revised bill amount from the subscriber, either with or without an instruction to pay the bill, in real time while the user entity 52 remains on-line in step 1224B'. Here again, the revised detailed phone bill data is stored in the database component 32 of the billing entity 56 and the revised total phone bill amount is stored, at least temporarily, in the database component 32 of the EPCS 58.

If the subscriber has clicked on the "home" icon 1167B, the subscriber can again view screen 1140A or 1140B. In this viewing the screen 1140A is unmodified. On the other hand, the screen 1140B is modified to display the revised total phone bill amount. As previously discussed, this is accomplished by the EPCS 58 generating, responsive to the receipt of the revised total bill amount and in real time, a revised screen 1140B for presentation to the subscriber which reflects the biller computed revised total phone bill amount.

At this point it should be noted that while the foregoing detailed description was directed to an electronic bill presentment and payment technique, any number of system types can employ the distributed database entities 30 to facilitate distributed data accessing within a network in accordance with the present invention.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A system comprising:
a first network station associated with a biller that is configured to (i) transmit, to a second network station associated with a user, billing information representing a first amount of an available bill of the biller for the user, (ii) receive a disputation of the first amount of the available bill, and (iii) transmit, to the second network station in response to the received disputation, a revised amount of the available bill and a selectable payment indicator; wherein selection of the selectable payment indicator by the user is configured to establish a communications link between the second network station and a third network station associated with a payment entity, for transmitting a request from the second network station to the third network station to pay the revised amount of the available bill to the biller on behalf of the user.

2. A system according to claim 1, wherein:
the first network station is further configured to transmit bill availability information identifying an available bill for the user;
receive a request for the available bill from the user; and
transmit the billing information in response to the received request.

3. A system according to claim 1, wherein:
the first network station is further configured to transmit bill availability information identifying an available bill for the user to the third network station.

4. A system according to claim 1, further comprising:
a database configured to store the billing information and the first amount of the available bill.

5. A system according to claim 4, wherein the database is further configured to store the revised amount.

6. A system according to claim 1, wherein:
the revised amount of the available bill replaces the first amount of the available bill.

7. A system according to claim 1, wherein:
the first network station if further configured to receive a payment from the third network station for the revised amount.

8. A system according to claim 7, wherein:
the first network station is further configured to transmit a notification to the third network station that the payment has been received.

9. A method comprising:
transmitting a determined first amount of an available bill from a first network location to a second network location;
receiving a disputation of the first amount of the available bill at the first network location;
determining a revised amount of the available bill at the first network location in response to the received disputation; and
transmitting the revised amount of the available bill and a selectable payment indicator to the second network location, wherein selection of the selectable payment indicator is configured to establish a communications link with a third network location, in order to transmit a request from the second network location to the third network location to pay the revised amount of the available bill.

10. A method according to claim 9, wherein the first network location is associated with a billing entity.

11. A method according to claim 9, wherein the second network location is associated with a customer of a billing entity.

12. A method according to claim 9, wherein the third network location is associated with a payment service provider.

13. A method according to claim 9, further comprising the steps of:
transmitting bill availability information identifying the available bill from the first network location; and
receiving a request for the available bill.

14. A method according to claim 13, further comprising the steps of:
transmitting the available bill from the first network location to the second network location.

15. A method according to claim 14, wherein the transmitted available bill includes the determined revised amount.

16. A method according to claim 9, further comprising the steps of:
storing, in a database, bill availability information identifying the available bill.

17. A method according to claim 16, further comprising the step of:

storing the revised amount in the database.

18. A method according to claim 9, further comprising:

receiving a payment from the third network location for the revised amount.

19. A method according to claim 18, further comprising:

transmitting a notification to the third network location that the payment has been received.

20. A system comprising:

at least one network interface configured to transmit and receive communications via a network; and a processor configured (i) to direct the at least one network interface to transmit a network communication of a first amount of one of a plurality of available bills identified in bill availability information for a first of a plurality of different users from the biller to the first user, (ii) to receive, though the at least one network interface, a disputation of the first amount of the available bill, and (iii) to direct the at least one network interface to transmit, to the first user in response to the received disputation, a revised amount of the available bill and a selectable payment indicator, wherein selection of the selectable payment indicator by the user is configured to establish a communications link between the user and a payment entity, in order to transmit a request from the first user to the payment entity to pay the revised amount of the available bill to the biller on behalf of the user.

21. A system according to claim 20, further comprising:

a database configured to store the bill availability information.

22. A system according to claim 21, wherein:

the processor is further configured (i) to direct the at least one network interface to transmit an indication of the stored bill availability information identifying the one available bill for the first user, and (ii) to receive though the at least one network interface a request for the one available bill from the user.

23. A system comprising:

means for transmitting a determined first amount of an available bill from a biller to a user;

means for receiving a disputation of the first amount of the available bill at the biller;

means for determining a revised amount of the available bill in response to the received disputation; and means for transmitting the revised amount of the available bill and a selectable payment indicator to the user, wherein selection of the selectable payment indicator is configured to establish a communications link with a payment entity, in order to transmit a request from the user to the payment entity to pay the revised amount of the available bill.

\* \* \* \* \*

UNITED STATES PATENT AND TRADEMARK OFFICE
CERTIFICATE OF CORRECTION

| | | |
|---|---|---|
| PATENT NO. | : 7,392,223 B1 | |
| APPLICATION NO. | : 09/387764 | |
| DATED | : June 24, 2008 | |
| INVENTOR(S) | : Ganesan et al. | |

It is certified that error appears in the above-identified patent and that said Letters Patent is hereby corrected as shown below:

Col. 22, line 21 – change "if" to --is--

Col. 22, line 59 – change "steps" to --step--

Col. 22, line 65 – change "steps" to --step--

Col. 23, line 20 – change "though" to --through--

Col. 24, line 10 – change "though" to --through--

Signed and Sealed this

Ninth Day of September, 2008

JON W. DUDAS
*Director of the United States Patent and Trademark Office*